US012615297B2

(12) United States Patent
Saripalli et al.

(10) Patent No.: US 12,615,297 B2
(45) Date of Patent: Apr. 28, 2026

(54) DATA SECURITY GROUPING AND RANKING

(71) Applicant: Microsoft Technology Licensing, LLC, Redmond, WA (US)

(72) Inventors: Annapurna Lakshmi Saripalli, Hyderabad (IN); Srivalli Chavali, Redmond, WA (US); Ashish Mehndi, Hyderabad (IN); Rajeethkumar Dharmaraj, Coimbatore (IN); Chithirai Meenal Thiyagarajan, Chennai (IN); Chinmaya Mishra, Bangalore (IN); Jovin Vasanth Kumar Deva Sahayam Arul Raj, Redmond, WA (US); Deepika Puri, Syosset, NY (US); Ankit Srivastava, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 68 days.

(21) Appl. No.: 18/398,541

(22) Filed: Dec. 28, 2023

(65) Prior Publication Data

US 2025/0088538 A1    Mar. 13, 2025

(30) Foreign Application Priority Data

Sep. 11, 2023    (IN) .............................. 202311061097

(51) Int. Cl.
*H04L 9/40*          (2022.01)
(52) U.S. Cl.
CPC ................................... *H04L 63/20* (2013.01)

(58) Field of Classification Search
None
See application file for complete search history.

(56) References Cited

U.S. PATENT DOCUMENTS

| | | | |
|---|---|---|---|
| 7,958,147 | B1 | 6/2011 | Turner et al. |
| 8,769,605 | B2 | 7/2014 | Kaufmann |

(Continued)

FOREIGN PATENT DOCUMENTS

WO          2019213086 A1    11/2019

OTHER PUBLICATIONS

International Search Report and Written Opinion received for PCT Application No. PCT/US2024/042844, Nov. 5, 2024, 17 pages.

(Continued)

*Primary Examiner* — Atta Khan

(57)          ABSTRACT
Some embodiments address technical challenges arising from efforts to identify and mitigate security risks, in particular but not only, risks that sensitive data will be exfiltrated. Some embodiments provide or utilize an anomaly detector which is configured to detect a security anomaly in data based on at least a distribution of sensitive information type documents in a collection of documents and classifications of documents by trainable classifiers based on machine learning. Some embodiments provide or utilize a security policy generator which is configured to proactively and automatically generate security policy recommendations, rank at least two of the security policy recommendations, and present at least one top-ranked generated security policy recommendation in a user interface. Some embodiments generate a security policy in a managed computing system based on at least an anomaly score, and then configure the managed computing system according to the generated security policy.

19 Claims, 13 Drawing Sheets

METHOD 1300

START

CALCULATE 1302 RANKED RISK SCORE, ANOMALY SCORE, SCORE CONSTITUENTS

GENERATE 1304 SECURITY POLICY RECOMMENDATION

GENERATE 1306 SECURITY POLICY

CONFIGURE 1308 MACHINE PER SECURITY POLICY

FINISH

(56)                    References Cited

U.S. PATENT DOCUMENTS

| | | | |
|---|---|---|---|
| 10,768,719 B2 | 9/2020 | Ju et al. | |
| 11,349,876 B2 | 5/2022 | Krishna | |
| 11,379,607 B2 | 7/2022 | Swafford | |
| 11,503,050 B2 | 11/2022 | Sites | |
| 2015/0180903 A1* | 6/2015 | Cooper | G06F 21/566 |
| | | | 726/1 |
| 2023/0185945 A1* | 6/2023 | Levy | H04L 9/3226 |
| | | | 726/23 |
| 2023/0188500 A1* | 6/2023 | Pikarski | H04L 63/0263 |
| | | | 726/1 |

OTHER PUBLICATIONS

"Application as Filed in U.S. Appl. No. 17/990,667", filed Nov. 19, 2022, 90 Pages.

"Application as Filed in U.S. Appl. No. 18/112,090", filed Feb. 21, 2021, 73 Pages.

Zhao, et al., "Anomaly Detection of Unstructured Big Data Via Semantic Analysis and Dynamic Knowledge Graph Construction", Retrieved from: URL: https://www.spiedigitallibrary.org/conference-proceedings-of-spie/11756/117560N/Anomaly-detection-of-unstructured-big-data-via-semantic-analysis-and/10.1117/12.2589047.full?SSO=1, In Proceedings of Signal Processing, Sensor/Information Fusion, and Target Recognition XXX, vol. 11756, Apr. 12, 2021, 16 pages.

International Preliminary Report on Patentability (Chapter I) received for PCT Application No. PCT/US2024/042844 mailed on Mar. 19, 2026, 11 Pages.

* cited by examiner

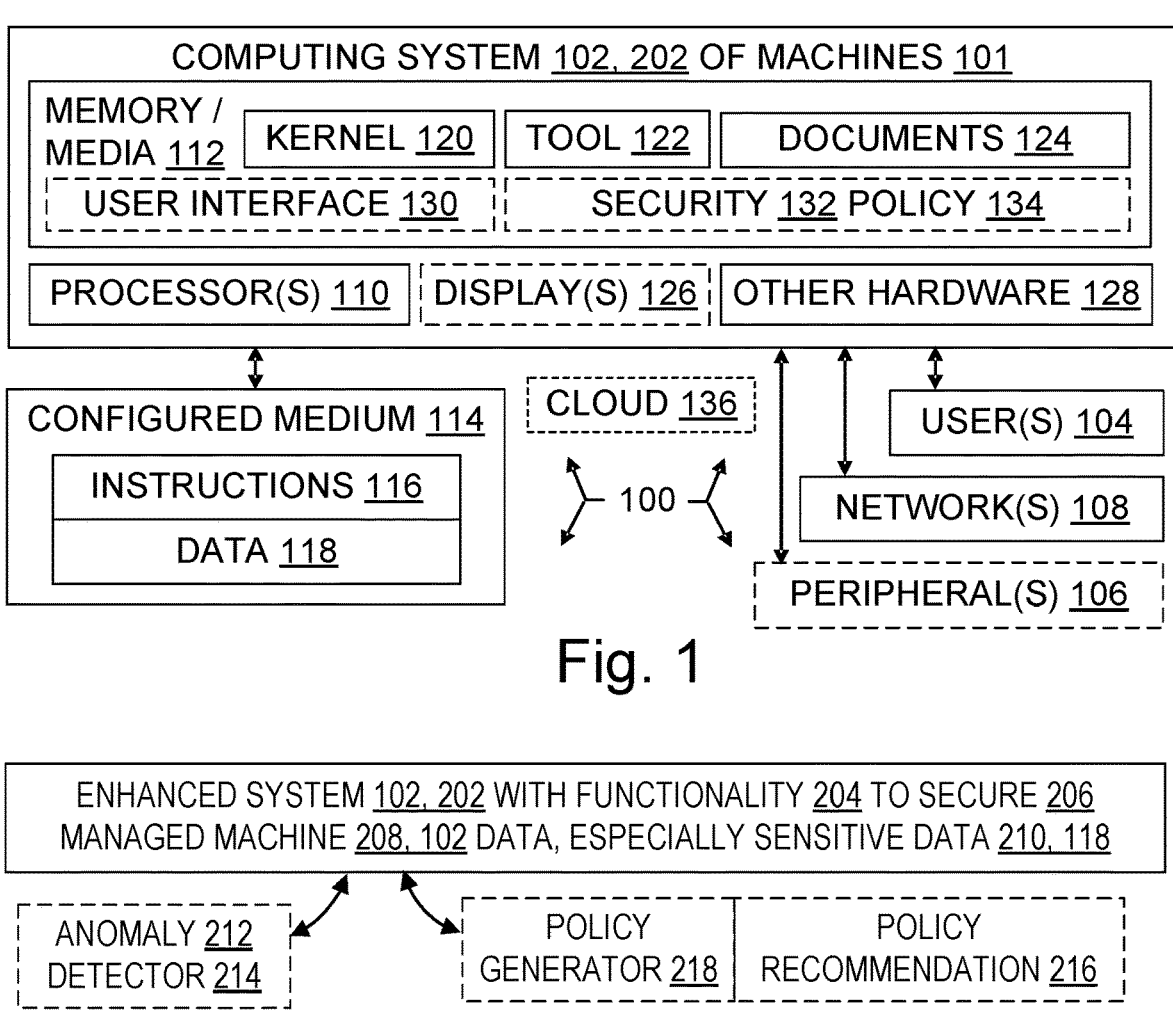

COMPUTING SYSTEM 102, 202 OF MACHINES 101

MEMORY / MEDIA 112    KERNEL 120    TOOL 122    DOCUMENTS 124

USER INTERFACE 130    SECURITY 132 POLICY 134

PROCESSOR(S) 110    DISPLAY(S) 126    OTHER HARDWARE 128

CONFIGURED MEDIUM 114

INSTRUCTIONS 116

DATA 118

CLOUD 136

100

USER(S) 104

NETWORK(S) 108

PERIPHERAL(S) 106

Fig. 1

ENHANCED SYSTEM 102, 202 WITH FUNCTIONALITY 204 TO SECURE 206 MANAGED MACHINE 208, 102 DATA, ESPECIALLY SENSITIVE DATA 210, 118

ANOMALY 212 DETECTOR 214

POLICY GENERATOR 218

POLICY RECOMMENDATION 216

Fig. 2

ENHANCED SYSTEM 102, 202 WITH DYNAMIC SECURITY POLICY GENERATION FUNCTIONALITY 204

MEMORY/MEDIA 112, 114

ANOMALY DETECTOR 214 USING DOCUMENT DISTRIBUTION 302 AND CLASSIFICATION 304, POLICY GENERATOR 218 PRESENTING RANKING 306

MACHINE LEARNING 308 FEATURE 310 ENGINEER 312    ACTIVITY 314 WEIGHTS 316    BASE STREAM DATA 318 PLATFORM 320

PROCESSOR 110    ANOMALY 212 CATEGORIES 322    INTERFACE(S) 324

Fig. 3

| ASPECTS OF SOME RISK 402 SCORING 404 MECHANISMS 406 | |
|---|---|
| MANAGING COMPUTER SYSTEM 408, 102 | SENSITIVITY 410 SCORE 412 |
| DENSE RANKED WEIGHT 414 | COMBINED ANOMALY SCORE 416 |
| SENSITIVE INFORMATION TYPE 418 DOCUMENT 124 DISTRIBUTION 302 | BOX COX 420 TRANSFORM 422 |
| | SIGMOID 424 TRANSFORM 422 |
| MITIGATION 426 ACTION 428 | EXFILTRATION 430 |
| SENSITIVITY GROUP 432 | CLASSIFICATION 304 GROUP 434 |
| ANOMALY TYPE 436 | SECURITY POLICY ACTION 438 |
| TRAINED 440 CLASSIFIER 442 | DOCUMENT COLLECTION 444 |
| ANONYMOUS LINK 446  FILE OR FOLDER 448 | SECURITY GAP 456 |
| SENSITIVITY LABEL 450 CHANGE / REMOVAL 452 / 454 | |
| EMAIL OR MESSAGE 460 | ALERT 458 |

Fig. 4

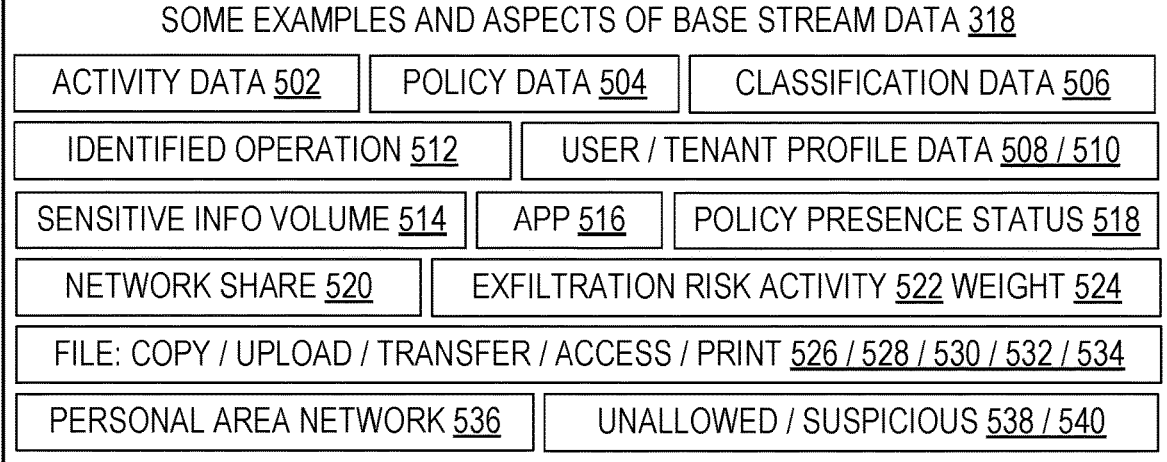

| SOME EXAMPLES AND ASPECTS OF BASE STREAM DATA 318 | | |
|---|---|---|
| ACTIVITY DATA 502 | POLICY DATA 504 | CLASSIFICATION DATA 506 |
| IDENTIFIED OPERATION 512 | USER / TENANT PROFILE DATA 508 / 510 | |
| SENSITIVE INFO VOLUME 514 | APP 516 | POLICY PRESENCE STATUS 518 |
| NETWORK SHARE 520 | EXFILTRATION RISK ACTIVITY 522 WEIGHT 524 | |
| FILE: COPY / UPLOAD / TRANSFER / ACCESS / PRINT 526 / 528 / 530 / 532 / 534 | | |
| PERSONAL AREA NETWORK 536 | UNALLOWED / SUSPICIOUS 538 / 540 | |

Fig. 5

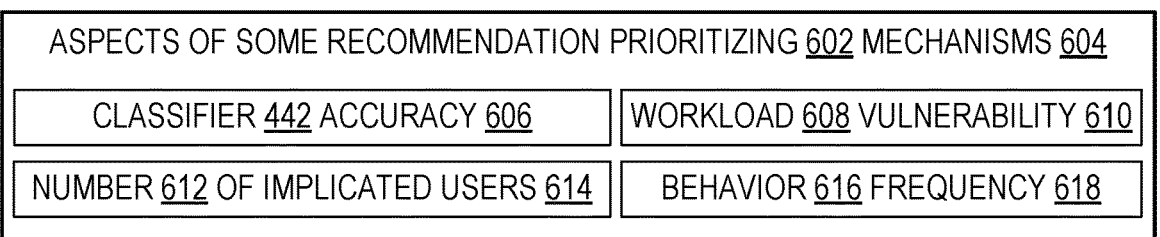

| ASPECTS OF SOME RECOMMENDATION PRIORITIZING 602 MECHANISMS 604 | |
|---|---|
| CLASSIFIER 442 ACCURACY 606 | WORKLOAD 608 VULNERABILITY 610 |
| NUMBER 612 OF IMPLICATED USERS 614 | BEHAVIOR 616 FREQUENCY 618 |

Fig. 6

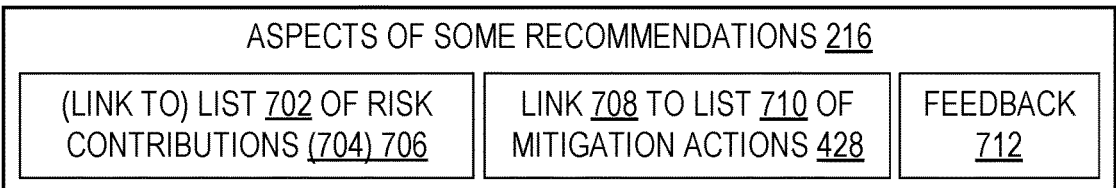

| ASPECTS OF SOME RECOMMENDATIONS 216 | | |
|---|---|---|
| (LINK TO) LIST 702 OF RISK CONTRIBUTIONS (704) 706 | LINK 708 TO LIST 710 OF MITIGATION ACTIONS 428 | FEEDBACK 712 |

Fig. 7

USER EXPERIENCE 802
  ADMIN PORTAL 804

CLOUD FILTERING SERVICE 806
  RECOMMENDATION API 808
    DATA PROVIDER 810

EXAMPLE ARCHITECTURE 800

DATA PLATFORM 320

LARGE DATASET CLUSTER 812
  INPUT CONSOLIDATOR 814
  INSIGHT GENERATOR 816

DATA STORE 818
  INSIGHTS 820
  PREFERENCES 822

DATA LAKE STORAGE 824
  LOGS 826
  TENANT LABEL CACHE 828
  BASE STREAM CONSOLIDATED LOGS 830
  MACHINE LEARNING RULES 832
  RO EVENTS 834

EVENT GRID CONFIGURATOR 836

Fig. 8

METHOD 1300    ( START )

CALCULATE 1302 RANKED RISK SCORE, ANOMALY SCORE, SCORE CONSTITUENTS

GENERATE 1304 SECURITY POLICY RECOMMENDATION
GENERATE 1306 SECURITY POLICY

CONFIGURE 1308 MACHINE PER SECURITY POLICY ( FINISH )

EXAMPLE ARCHITECTURE 1000

EXAMPLE ARCHITECTURE 1100

EXAMPLE ARCHITECTURE 1200

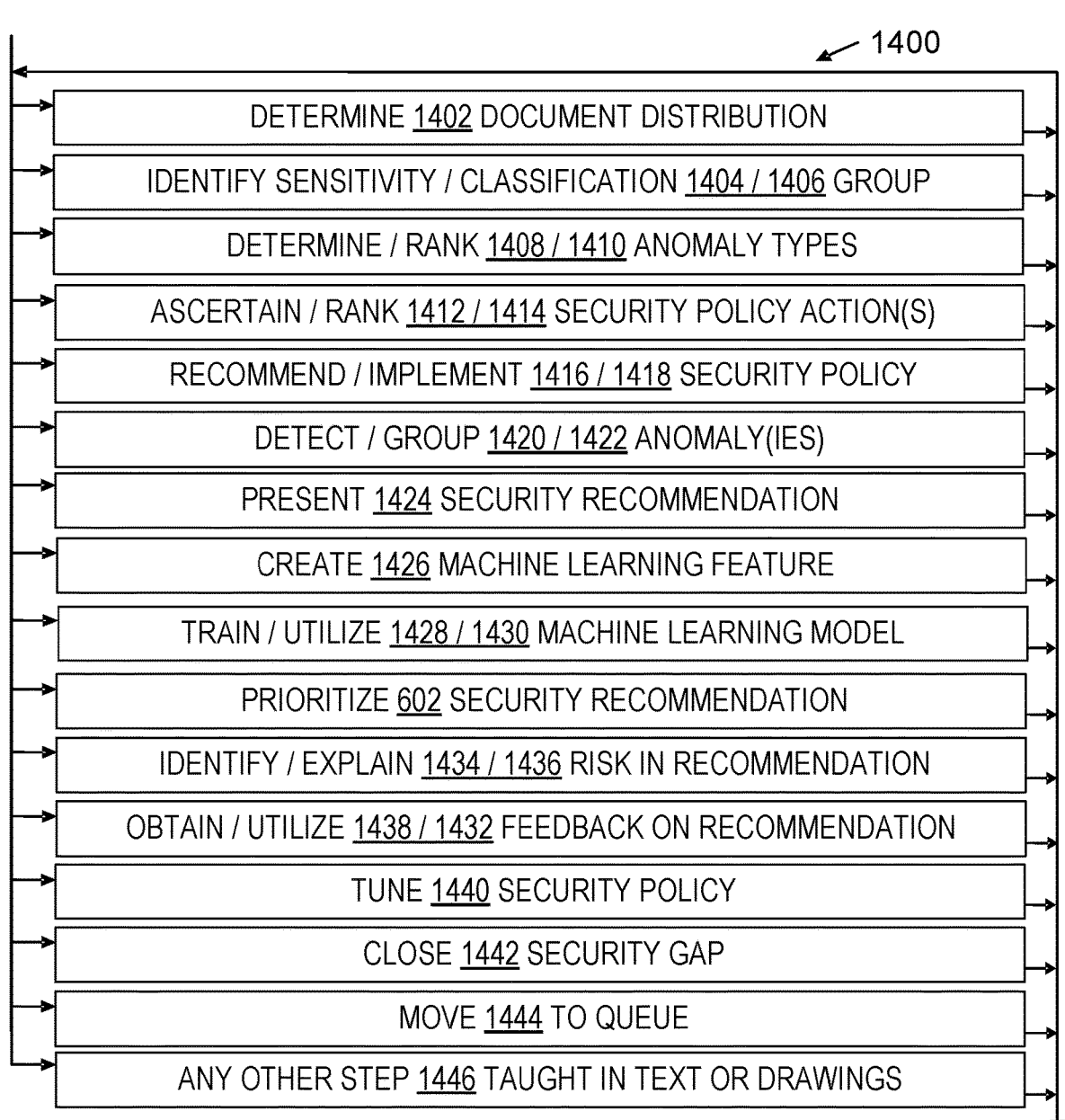

1400

DETERMINE 1402 DOCUMENT DISTRIBUTION

IDENTIFY SENSITIVITY / CLASSIFICATION 1404 / 1406 GROUP

DETERMINE / RANK 1408 / 1410 ANOMALY TYPES

ASCERTAIN / RANK 1412 / 1414 SECURITY POLICY ACTION(S)

RECOMMEND / IMPLEMENT 1416 / 1418 SECURITY POLICY

DETECT / GROUP 1420 / 1422 ANOMALY(IES)

PRESENT 1424 SECURITY RECOMMENDATION

CREATE 1426 MACHINE LEARNING FEATURE

TRAIN / UTILIZE 1428 / 1430 MACHINE LEARNING MODEL

PRIORITIZE 602 SECURITY RECOMMENDATION

IDENTIFY / EXPLAIN 1434 / 1436 RISK IN RECOMMENDATION

OBTAIN / UTILIZE 1438 / 1432 FEEDBACK ON RECOMMENDATION

TUNE 1440 SECURITY POLICY

CLOSE 1442 SECURITY GAP

MOVE 1444 TO QUEUE

ANY OTHER STEP 1446 TAUGHT IN TEXT OR DRAWINGS

Fig. 14

| Day | User Type | User | Activity | Documents | SIT type | Trainable classifier |
|---|---|---|---|---|---|---|
| 1 | u1 | i1 | a1 | d1 | sit 1, sit 2 | ml1 |
| 1 | u1 | i1 | a1 | d2 | sit2 | ml1 |
| 1 | u1 | i2 | a1 | d3 | sit5 | |
| 1 | u1 | i2 | a1 | d4 | sit3 | |
| 1 | u4 | i3 | a2 | d5 | sit7 | |
| 1 | u4 | i3 | a2 | d6 | | ml5 |
| 2 | u1 | i1 | a1 | d7 | sit2 | |
| 2 | u1 | i1 | a2 | d8 | | ml2 |
| 2 | u1 | i2 | a1 | d9 | | ml3 |
| 2 | u1 | i2 | a2 | d10 | sit6 | |
| 2 | u4 | i3 | a2 | d11 | sit8 | |
| 3 | u1 | i1 | a2 | d12 | sit4 | ml4 |

Fig. 15

| Doc | SIT_HITS | TC HITS | SIT & TC HITS | 25th % SIT | 50th % | 75th % | 100th % | Bucket |
|-----|----------|---------|---------------|------------|--------|--------|---------|--------|
| d1 | 10 | 1 | 11 | | | | | SIT100 |
| d2 | 2 | 1 | 3 | | | | | SIT25 |
| d3 | 3 | 0 | 3 | | | | | SIT25 |
| d4 | 1 | 0 | 1 | | | | | SIT25 |
| d5 | 6 | 0 | 6 | | | | | SIT50 |
| d6 | 0 | 1 | 1 | 0.75 | 4 | 6.5 | 10 | SIT25 |
| d7 | 8 | 0 | 8 | | | | | SIT75 |
| d8 | 0 | 1 | 1 | | | | | SIT25 |
| d9 | 0 | 1 | 1 | | | | | SIT25 |
| d10 | 9 | 0 | 9 | | | | | SIT75 |
| d11 | 6 | 0 | 6 | | | | | SIT75 |
| d12 | 5 | 1 | 6 | | | | | SIT75 |

Fig. 16

| Date | UserType | User | Activity | SIT25 | SIT50 | SIT75 | SIT100 | TC Hits | SIT&TC Hits | #Sensitive Docs | Percentile/Median (User Type level) | CutOff |
|------|----------|------|----------|-------|-------|-------|--------|---------|-------------|-----------------|-------------------------------------|--------|
| 1 | u1 | i1 | a1 | 1 |   |   | 1 | 2 | 2 | 2 | 1 | 1 |
| 1 | u1 | i2 | a1 | 2 |   |   |   |   |   | 2 | 1 | 1 |
| 1 | u4 | i3 | a2 | 1 | 1 |   |   | 1 |   | 2 | 1.5 | 1 |
| 2 | u1 | i1 | a1 |   |   | 1 |   |   |   | 1 | 1 | 0 |
| 2 | u1 | i1 | a2 | 1 |   |   |   | 1 |   | 1 | 1 | 0 |
| 2 | u1 | i2 | a1 | 1 |   |   |   | 1 |   | 1 | 1 | 0 |
| 2 | u1 | i2 | a2 |   |   | 1 |   |   |   | 1 | 1 | 0 |
| 2 | u4 | i3 | a2 |   |   | 1 |   |   |   | 1 | 1.5 | 0 |
| 3 | u1 | i1 | a2 |   |   | 1 |   | 1 | 1 | 1 | 1 | 0 |

Fig. 17

| Date | UserType | User | Activity | SIT Score | Sensitivity Score | Mean Sensitivity Score (User type level) | Weight Score | Normalized Sensitivity Score |
|------|----------|------|----------|-----------|-------------------|------------------------------------------|--------------|------------------------------|
| 1 | u1 | i1 | a1 | 0.5 | 1.700 | 0.555 | 3.063 | 1.000 |
| 1 | u1 | i2 | a1 | 0.2 | 0.040 | 0.555 | 0.072 | 0.000 |
| 1 | u4 | i3 | a2 | 0.3 | 0.460 | 0.450 | 1.022 | 0.500 |
| 2 | u1 | i1 | a1 | 0.3 | 0.060 | 0.555 | 0.108 | 0.012 |
| 2 | u1 | i1 | a2 | 0.1 | 0.420 | 0.450 | 0.933 | 0.450 |
| 2 | u1 | i2 | a1 | 0.1 | 0.420 | 0.555 | 0.757 | 0.229 |
| 2 | u1 | i2 | a2 | 0.3 | 0.060 | 0.450 | 0.133 | 0.000 |
| 2 | u4 | i3 | a2 | 0.3 | 0.060 | 0.060 | 1.000 | 0.000 |
| 3 | u1 | i1 | a2 | 0.3 | 0.860 | 0.450 | 1.911 | 1.000 |

Fig. 18

| Date | UserType | User | CutOff | Ranked Risk Score | Ranked Sum Ranked Risk Score | Combined Anomaly Score | Anomaly Score | Anomaly Anomaly Score | Anomaly |
|---|---|---|---|---|---|---|---|---|---|
| 1 | u1 | i1 | 1 | 2.00 | 2.00 | 0.67 | 2.13 | 0.8939348 | 1 |
| 1 | u1 | i2 | 1 | 0.00 | 0.00 | 0.00 | -0.99 | 0.2714365 | 0 |
| 1 | u4 | i3 | 1 | 0.50 | 0.50 | 0.17 | -0.21 | 0.4482818 | 0 |
| 2 | u1 | i1 | 0 | 0.02 | 0.47 | 0.16 | -0.25 | 0.4383131 | 0 |
| 2 | u1 | i2 | 0 | 0.46 | 0.46 | 0.15 | -0.27 | 0.4320786 | 0 |
| 2 | u4 | i3 | 0 | 0.00 | 0.00 | 0.00 | -0.99 | 0.2714365 | 0 |
| 3 | u1 | i1 | 0 | 1.00 | 1.00 | 0.33 | 0.57 | 0.6392513 | 0 |

Fig. 19

DATA SECURITY GROUPING AND RANKING

RELATED APPLICATION

The present application incorporates by reference the entirety of, and claims priority to, India provisional patent application No. 202311061097 filed 11 Sep. 2023 in the Indian Patent Office.

BACKGROUND

Attacks on a computing system may take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within the computing system. No single security mechanism is able to detect every kind of cyberattack, able to determine the scope of an attack or vulnerability, or able to end every detected cyberattack. But sometimes combining and layering a sufficient number and variety of defenses and investigative tools will prevent an attack, deter an attacker, or at least help limit the scope of harm from an attack or a vulnerability.

To implement defense in depth, cybersecurity professionals consider the different kinds of attacks that could be made against a computing system, and the different vulnerabilities the system may include. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place or removing a particular vulnerability to attack. They investigate the scope of an attack, and try to detect vulnerabilities before they are exploited in an attack. Some defenses or investigations might not be feasible or cost-effective for the particular computing system. However, improvements in cybersecurity remain possible, and worth pursuing.

SUMMARY

Some embodiments address technical challenges arising from efforts to identify and mitigate security risks, in particular but not only, risks that sensitive data will be exfiltrated. Some embodiments provide or utilize an anomaly detector which is configured to detect a security anomaly in data based on at least a distribution of sensitive information type documents in a collection of documents and classifications of documents by machine-learning-based classifiers. Some embodiments provide or utilize a security policy generator which is configured to proactively and automatically generate security policy recommendations, rank at least two of the security policy recommendations, and present at least one top-ranked generated security policy recommendation in a user interface. Some embodiments generate a security policy in a managed computing system based on at least an anomaly score, and then configure the managed computing system according to the generated security policy.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 1 is a diagram illustrating aspects of computer systems and also illustrating configured storage media, including some aspects generally suitable for systems which provide dynamic security policy generation functionality, which is a functionality that includes dynamic security recommendation generation in some embodiments consistent with this or other Figures herein;

FIG. 2 is a block diagram illustrating aspects of a family of enhanced systems which are each configured with dynamic security policy generation functionality;

FIG. 3 is a block diagram illustrating aspects of another family of systems which are each enhanced with dynamic security policy generation functionality;

FIG. 4 is a block diagram illustrating some aspects of security risk scoring mechanisms;

FIG. 5 is a block diagram illustrating some examples and aspects of base stream data which is analyzed in some scenarios by dynamic security policy generation functionality;

FIG. 6 is a block diagram illustrating some aspects of security recommendation prioritizing mechanisms;

FIG. 7 is a block diagram illustrating some aspects of security recommendations;

FIG. 8 is an architecture diagram illustrating aspects of a first example architecture suitable for embodying dynamic security policy generation functionality;

FIG. 14 is a flowchart further illustrating steps in some dynamic security policy generation methods, and incorporating FIG. 13;

FIG. 15 shows some sample data;

FIG. 16 illustrates sensitivity buckets for the FIG. 15 sample data;

FIG. 17 illustrates aggregate records for the FIG. 15 sample data;

US 12,615,297 B2

3

Figures 9, 13:
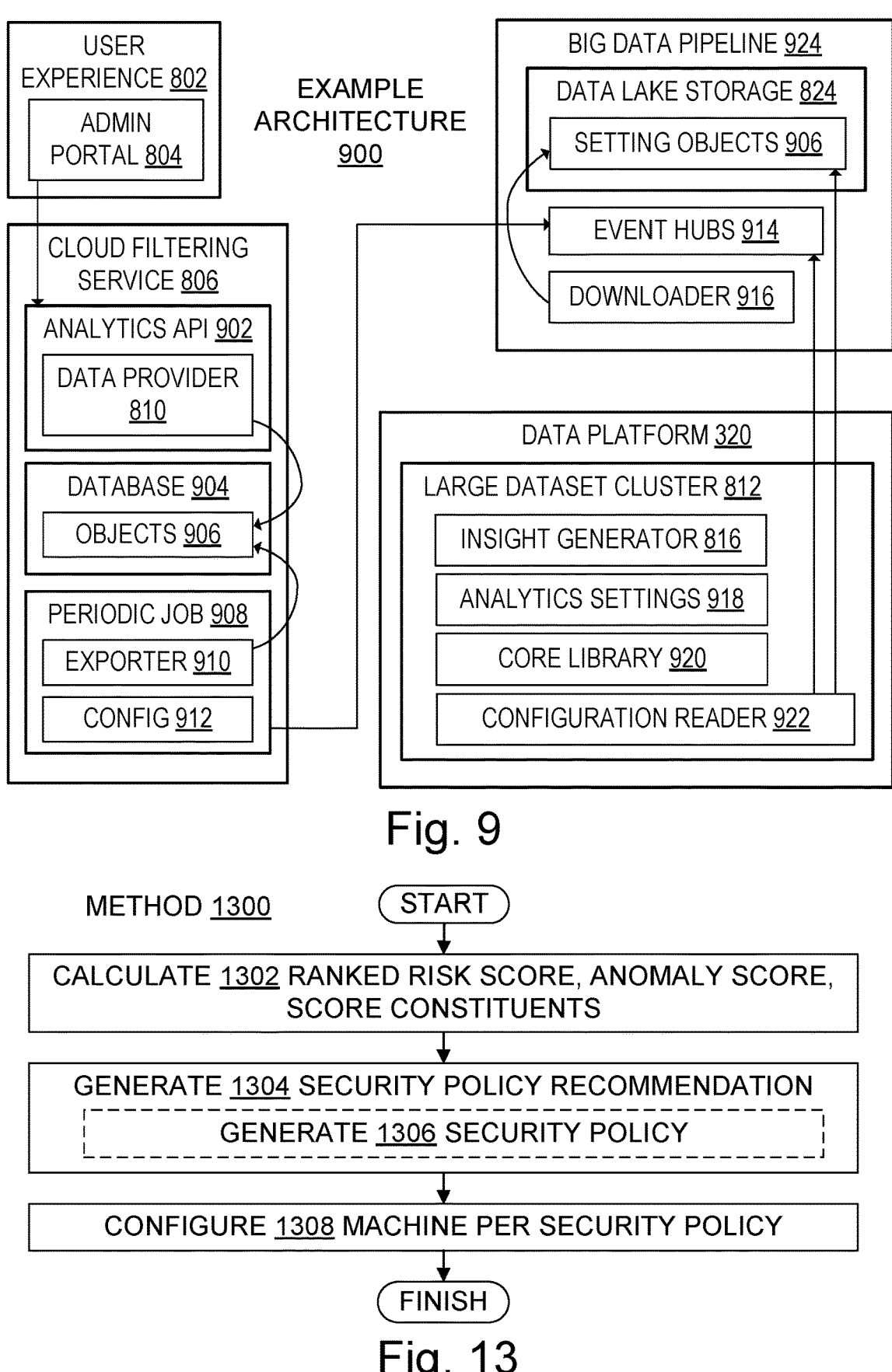
FIG. 9 is an architecture diagram illustrating aspects of a second example architecture suitable for embodying dynamic security policy generation functionality.
FIG. 13 is a flowchart illustrating steps in a dynamic security policy generation method.

FIG. 18 illustrates risk scores or their constituents for the FIG. 15 sample data; and FIG. 19 illustrates anomaly scores for the FIG. 15 sample data.

DETAILED DESCRIPTION

Overview

Some teachings described herein were motivated by technical challenges faced during efforts to improve technology for data security. In particular, challenges were faced during efforts to facilitate usage of M365 Purview™ offerings which are designed to assist with data governance and data management (mark of Microsoft Corporation). In particular, it is a challenge to identify and understand security risks and vulnerabilities and to determine which risks to prioritize on a regular basis. These challenges were motivations, but teachings herein are not limited in their scope or applicability to the particular motivational challenges.

In some embodiments, a method of securing data through dynamic policy generation is performed by a managing computing system. The method includes proactively and automatically: calculating a ranked risk score based on at least a normalized sensitivity score and a dense ranked weight; calculating a combined anomaly score based on at least the ranked risk score; calculating an anomaly score based on at least a box cox transformation of the combined anomaly score; generating a security policy in a managed computing system based on at least the anomaly score; and configuring a managed computing system according to the generated security policy. This method of risk scoring, security policy generation, and security policy enforcement provides several technical benefits. These benefits include leveraging artificial intelligence within guiderail scores, thereby mitigating against harm from AI fabrications, human errors, systemic errors, or other errors; conforming security policies to current conditions and contents of a managed system; and relieving personnel burdens by generating security policies proactively and automatically.

In some embodiments, the method includes proactively and automatically calculating the dense ranked weight based on at least two differently weighted exfiltration risk activities. This provides the technical benefit of more accurate risk scoring by giving greater weight to riskier activities, instead of imprudently treating all activities as though they posed the same level of exfiltration risk.

In some embodiments, a managed computing system is configured to secure data. The managed computing system includes: a digital memory; a processor set with at least one processor, the processor set in operable communication with the digital memory; a user interface; an anomaly detector which is configured to, upon execution by the processor set, detect a security anomaly in data based on at least a distribution of sensitive information type documents in a collection of documents and classifications of documents by trainable classifiers based on machine learning; and a security policy generator which is configured to, upon execution by the processor set, proactively and automatically: generate security policy recommendations, rank at least two of the security policy recommendations, and present at least one top-ranked generated security policy recommendation via the user interface.

These managed computing system embodiment characteristics provide several technical benefits. These benefits include better detection of security anomalies than would be available from an analysis that ignores sensitive information type data or ignores document classification data; efficiency gains from the use of artificial intelligence for document classification; and efficiency gains from proactive automatic ranking of security recommendations.

In some embodiments, the security policy generator upon execution ranks at least two of the security policy recommendations at least in part by prioritizing, and the prioritizing satisfies at least one of: a higher data classifier accuracy contributes to a higher priority; a greater workload vulnerability contributes to a higher priority; a larger set of implicated users contributes to a higher priority; or a higher frequency of a behavior contributes to a higher priority. Prioritizing the security policy recommendations in this manner provides the technical benefit of focusing subsequent security activities on risks that are more likely to materialize, risks that are more urgent, or risks that have greater potential impact; this focus tends to enhance system security. This technical benefit arises regardless of whether the security activities being guided by the focused priorities are instigated by personnel or by proactive tools.

In some embodiments, a security policy recommendation presented via the user interface: identifies a security risk; includes or links to a list of users, files, and actions which contribute to the security risk; and includes or links to a mitigation action which upon performance mitigates the security risk. This manner of presentation provides the technical benefit of promoting better understanding of risks by admins and security personnel, as well as facilitating more efficient investigation of identified security risks.

In some embodiments, a proactively automatically generated security policy closes a security gap which is not identified in any alert that is raised or pending resolution in the computing system during the generating or the implementing. This provides the technical benefit of mitigating against security risks before they are exploited by attackers.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 130 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium

114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, dynamic security policy generation functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More about Systems

FIG. 2 illustrates a computing system 102 configured by one or more of the dynamic security policy generation functionality enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

FIG. 3 shows some aspects of some enhanced systems 202. This is not a comprehensive summary of all aspects of enhanced systems 202 or all aspects of dynamic security policy generation functionality 204. Nor is it a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

FIG. 4 shows some aspects of risk scoring mechanisms 406 suitable for use with or in dynamic security policy generation functionality 204. This is not a comprehensive summary of all aspects of risk scoring. FIG. 4 items are discussed at various points herein, and additional details regarding them are provided in the discussion of a List of Reference Numerals later in this disclosure document.

FIG. 5 shows some aspects of base stream data 318 suitable for use with or in dynamic security policy generation functionality 204. This is not a comprehensive summary of all aspects of data utilized with or in dynamic security policy generation functionality 204. FIG. 5 items are discussed at various points herein, and additional details regarding them are provided in the discussion of a List of Reference Numerals later in this disclosure document.

FIG. 6 shows some aspects of recommendation prioritizing mechanisms 604 suitable for use with or in dynamic security policy generation functionality 204. This is not a comprehensive summary of all aspects of recommendation prioritizing. FIG. 6 items are discussed at various points herein, and additional details regarding them are provided in the discussion of a List of Reference Numerals later in this disclosure document.

FIG. 7 shows some aspects of recommendations generated by some dynamic security policy generation functionality 204. This is not a comprehensive summary of all aspects of recommendations 216. FIG. 7 items are discussed at various points herein, and additional details regarding them are provided in the discussion of a List of Reference Numerals later in this disclosure document.

The other figures are also relevant to systems 202. FIGS. 8 through 12 illustrate some examples of dynamic security policy generation architecture, the understanding that other architectures consistent with teachings herein are also suitable. FIGS. 13 and 14 illustrate methods of functionality 204 operation in systems 202. FIGS. 15 through 19 show data illustrating risk scoring operations in some embodiments.

In some embodiments, the enhanced system 202 is networked through an interface 324. In some, an interface 324 includes hardware such as network interface cards, software such as network stacks, APIs, or sockets, combination items such as network connections, or a combination thereof.

Some embodiments include a managing computing system 102 which is configured to secure data of a managed computing system 102. The terms "managed computing system" (a.k.a. "managed system") and "managing computing system" (a.k.a. "managing system") are used to emphasize that in some scenarios one system 202,102 manages data security for data 118 of another system 102. However, it is also consistent with the teachings herein to view the managed system and the managing system as subsystems of a larger system 202, such that one part of the larger system 202 manages data security for another part of the larger system 202.

In some embodiments, a computing system 202 which is configured to secure data includes: a digital memory 112, a processor set 110 including at least one processor, the processor set in operable communication with the digital memory, and a user interface 130.

This example system 202 also includes an anomaly detector 214. The anomaly detector 214 is configured to, upon execution by the processor set 110, detect a security anomaly 212 in data based on at least a distribution 302 of sensitive information type 418 documents 124 in a collection of documents and classifications 304 of documents 124 by trainable classifiers 442 based on machine learning 308.

This example system 202 also includes a security policy generator 218. The security policy generator 218 is configured to, upon execution by the processor set 110, proactively and automatically: generate 1304 security policy recommendations 216, rank 306 at least two of the security policy recommendations 216, and present 1424 at least one top-ranked generated security policy recommendation via the user interface 130.

In some embodiments, anomalies 212 are grouped into categories 322 which include at least N of: exfiltration through an anonymous link 446, exfiltration through a device 101, exfiltration through a file 448 or folder 448 operation, exfiltration through an email 460 or message 460, or sensitivity label change 452 or removal 454. Depending on the embodiment, N is 1, 2, 3, 4, or 5. Unless stated otherwise, "or" is nonexclusive, e.g., "file or folder" means file only, or folder only, or both file and folder.

In some variations, email 460 anomalies are in a distinct category from message 460 anomalies, or an email 460 anomalies category is omitted, or a message 460 anomalies category is omitted. In some variations, file 448 anomalies are in a distinct category from folder 448 anomalies, or a file 448 anomalies category is omitted, or a folder 448 anomalies category is omitted. In some variations, sensitivity label change 452 anomalies are in a distinct category from sensitivity label removal 454 anomalies, or a sensitivity label change 452 anomalies category is omitted, or a sensitivity label removal 454 anomalies category is omitted.

In some embodiments, the computing system includes a data platform 320. In some, the data platform includes digital memory configured by containing base stream source data 318 which is utilized directly or indirectly by the anomaly detector 214. That is, the anomaly detector 214 ingests the base stream source data 318 (direct utilization), or the anomaly detector 214 ingests data produced by filtering, analyzing, summarizing, or otherwise processing the base stream source data 318 (indirect utilization). In some embodiments, the base stream source data includes at least N of: activity data 502, classification data 506, policy data 504, user profile data 508, or tenant profile data 510. Depending on the embodiment, N is 1, 2, 3, 4, or 5.

In some embodiments, the computing system includes a machine learning feature engineer 312 which upon execution creates at least one feature 310 using base stream source data 318. In some embodiments, the feature 310 represents at least one of: a volume 514 of sensitive information 210 for an identified operation 512, or a policy presence status 518 indicating a presence or an absence of a security policy 134 for sensitive information 210 for an identified operation 512.

In some embodiments, the anomaly detector 214 upon execution detects the security anomaly 212 in data at least in part by utilizing a dense ranked weight 414 which is based on at least weighted exfiltration 430 risk activities 522. In some embodiments, the weighted exfiltration risk activities 522 satisfy at least N of: a file-copied-to-removable-media activity weight 524 exceeds a file-uploaded-to-cloud activity weight 524; a file-uploaded-to-cloud activity weight 524 exceeds a file-transferred-by-personal-area-network activity weight 524; a file-transferred-by-personal-area-network activity weight 524 exceeds a sensitivity-label-changed activity weight 524; a file-accessed-by-unallowed-app activity weight 524 exceeds a file-uploaded-to-cloud activity weight 524; a file-accessed-by-unallowed-app activity weight 524 exceeds a file-accessed-by-suspicious-app activity weight 524; a file-copied-to-removable-media activity weight 524 exceeds a sensitivity-label-removed activity weight 524; a file-copied-to-removable-media activity weight 524 exceeds a file-printed activity weight 524; a file-printed activity weight 524 exceeds a file-copied-to-network-share activity weight 524; or a file-uploaded-to-suspicious-cloud activity weight 524 exceeds a file-uploaded-to-cloud activity weight 524. Depending on the embodiment, N is 1, 2, 3, 4, 5, 6, 7, 8, or 9. For legibility, reference numbers have not been inserted in these hyphenated risk activity weight 524 names, but for completeness the components thereof are shown in at least the reference numerals list and the drawings, e.g., file 448, removable media 114, cloud 136, personal area network 536, sensitivity label 450, and so on.

In some embodiments, the security policy generator 218 upon execution ranks 306 at least two of the security policy recommendations 216 at least in part by prioritizing 602. In some embodiments, prioritizing 602 satisfies at least one of: a higher data classifier 442 accuracy 606 contributes to a higher priority 602; a greater workload 608 vulnerability 610 contributes to a higher priority 602; a larger set of implicated users 104 contributes to a higher priority 602; or a higher frequency 618 of a behavior 616 contributes to a higher priority. Implicated users 104 refers to user accounts in a system 102, not to people per se.

In some embodiments, the anomaly detector 214 upon execution detects 1420 the security anomaly 212 in data based at least in part on at least one of: a per-user per-activity per-document risk score 404, or a per-user per-activity per-file risk score 404.

In some embodiments, the security policy generator 218 upon execution generates 1306 a new security policy 134, and the security policy recommendation 216 presented via the user interface corresponds to the new security policy. For example, the recommendation 216 corresponds because following the recommendation 216 increases system compliance with the policy, or the recommendation 216 corresponds because following the recommendation 216 gathers log data to check for non-compliance with the policy.

In some embodiments, the security policy recommendation 216 presented via the user interface: identifies a security risk 402; includes or links to a list 702 of users, files, and actions which contribute to the security risk; and includes or links to a mitigation action 428 which upon performance mitigates the security risk.

Other system embodiments are also described herein, either directly or derivable as system versions of described processes or configured media, duly informed by the extensive discussion herein of computing hardware.

Although specific dynamic security policy generation architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of dynamic security policy generation functionality, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 13 and 14 each illustrate a family of methods 1300 and 1400 respectively, which are performed or assisted by some enhanced systems, such as some systems 202 or another dynamic security policy generation functionality enhanced system as taught herein. Method family 1300 is a proper subset of method family 1400. FIGS. 8 through 12 also discuss data flow steps in various dynamic security policy generation architectures, and those steps are also a proper subset of method family 1400.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types or gestures or speaks a response to a presented recommendation 216, which is captured in the system 202 as digital data representing, e.g., acceptance, rejection, or modification of the recommendation. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 14. FIG. 14 is a supplement to the textual examples of embodiments provided herein and the textual descriptions of embodiments provided herein. In the event of any alleged inconsistency, lack of clarity, or excessive breadth due to an aspect or interpretation of FIG. 14, the text of this disclosure shall prevail over that aspect or interpretation of FIG. 14.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1400 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 14 to be non-operable, the sequence S is not within the scope of any claim. Any assertion otherwise is contrary to the present disclosure.

Some embodiments provide or utilize a method 1400 of securing data through dynamic policy generation, performed by a computing system 202. In this discussion and generally elsewhere herein, "method" is used in the legal sense and "process" is used in the computer science sense. The method 1400 includes proactively and automatically at least: calculating 1302 a ranked risk score 404 based on at least a normalized sensitivity score 412 and a dense ranked weight 414; calculating 1302 a combined anomaly score 416 based on at least the ranked risk score 404; calculating 1302 an anomaly score 404 based on at least a box cox transformation 420 or other transformation 422 of the combined anomaly score; generating 1306 a security policy 134 in a managed computing system based on at least the anomaly score; and configuring 1308 the managed computing system according to the generated security policy. In variations, the method 1400 generates 1304 a security policy recommendation 216 instead of, or in addition to, generating 1306 the security policy 134.

In some embodiments, the method includes proactively and automatically calculating 1302 the dense ranked weight based on at least two differently weighted 524 exfiltration risk activities 522.

In some embodiments, the method includes proactively and automatically determining 1402 a distribution 302 of sensitive information type 418 documents 124 in a collection of documents 124, and calculating 1302 the normalized sensitivity score based on at least a result of the determining.

In some embodiments, configuring 1308 the managed computing system according to the generated security policy includes at least one of: recommending 1416 the generated security policy via a user interface in the managed computing system, including presenting 1424 a mitigation action recommendation; or proactively implementing 1418 the generated security policy in the managed computing system.

In some embodiments, the method 1400 includes at least N constituents, each constituent being one of: determining 1402 a distribution of sensitive information type documents in a collection of documents; identifying 1404 a high-level sensitivity group of sensitive information type documents which have sensitive information at or above a specified high sensitivity level; determining a distribution of documents in the high-level sensitivity group 432 over classifications of sensitivity; identifying 1406 a high-level classification group 434 of documents which are classified at or above a specified high classification level; calculating 1302 a weighted sensitivity score based on at least the high-level sensitivity group and the high-level classification group; determining 1408 and ranking 1410 anomaly types 436 associated with one or more of the identified documents; ascertaining 1412 a recommended data security policy action 438 associated with one or more of the anomaly types; or ranking 141 at least two recommended data security policy actions. Depending on the embodiment, N is 1, 2, 3, 4, 5, 6, 7, or 8.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as anomaly detectors 214, policy generators 218, policy recommendations 216, activity weights 316, 524, anomaly categories 322, rankings 306, machine learning features 310, and groupings 432, 434, in the form of data 118 and instructions 116, read from a removable storage medium 114 and/or another source such as a network connection, to form a configured storage medium. The configured storage medium 112 is capable of causing a computer system 202 to perform technical process steps for dynamic security policy generation functionality 204 as disclosed herein. The Figures thus help illustrate configured storage media embodiments and process (a.k.a. method) embodiments, as well as system and process embodiments. In particular, any of the method steps illustrated in FIG. 13 or 14, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a method of securing data. This method 800 includes proactively and automatically: calculating 1302 a ranked risk score based on at least a normalized sensitivity score and a dense ranked weight; calculating 1302 a combined anomaly score based on at least the ranked risk score; calculating 1302 an anomaly score based on at least a box cox transformation of the combined anomaly score; generating 1306 a security policy in a managed computing system based on at least the anomaly score; and implementing 1418 the generated security policy in the computing system, thereby improving data security in the computing system. In some embodiments, the method includes obtaining 1438 feedback 712 on a presented security policy recommendation, and prioritizing 1432, 602 another security policy recommendation based at least in part on the feedback.

In some embodiments, the method includes calculating 1302 the normalized sensitivity score based at least on classification data 506 produced by machine learning classifiers 442 which are trained 1428 to recognize sensitive documents 210, 124.

In some embodiments, the method includes automatically and proactively tuning 1440 the security policy.

In some embodiments, the generated security policy closes 1442 a security gap 456 which is not identified in any alert 458 that is raised or pending resolution in the computing system during the generating 1304/1306 or the implementing 1418.

Additional Observations

Additional support for the discussion of dynamic security policy generation functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

Some embodiments provide or utilize an analytics and recommendation engine for onboarding to data security tools. Some include an end-to-end pipeline that has at least three components. One component is an analytics engine 214 which detects risks in a tenant based on telemetry of signals. One component is a platform 320 where these analytics are generated through machine learning algorithms. One component is a recommendation engine 218 and pipeline 218 which prioritizes the recommendation based on tenant and risk context, stores the state of the recommendation, and has a queue where customers can go and view recommendations and take action. Advantageously, the recommendation engine includes an intelligent system or model that assigns priority, surfaces that priority to customers, saves state of the recommendation, and has controls to move 1444 the recommendation to the queue. This engine is integrated and built on top of analytics, making these analytics actionable for the customer.

Even subject matter experts miss security problems, due to subjective blind spots and the sheer huge size of some datasets. Some of these problems are identified only after a leak or other adverse incident. However, embodiments taught herein provide beneficial alternatives to those approaches, by not relying on manually directed data scans and data searches. Instead, classifiers 442 and groupings 434, 432 are utilized, as a basis for analysis leading to dynamic blind spot identification and corresponding policy creation or adaptation.

Some embodiments provide or utilize machine learning models 442 24, trained to identify anomalies 212 (e.g., high sensitivity activities on high sensitivity documents), and to provide recommendation actions by reviewing tenant policies and suggesting new policies or other policy changes. In some embodiments, unsupervised machine learning (e.g., statistics) is used to rank and recommend security policy changes based on calculating a weighted sensitivity score. In some, the algorithmic logic includes:

(1) determining distribution of sensitive information type (SIT) documents (e.g., documents that include different quartile levels of sensitive information types (SITs) which may be high-to-low, such as social security numbers, credit card numbers, telephone numbers, numbers indicating quantity of an item, etc.);

(2) identifying the highest level SIT documents (e.g., documents with the highest level sensitive info);

(3) determining a distribution of documents over various classifications of sensitivity (e.g., documents that have quartile levels of an overall type of sensitive document, which may be high-to-low, such as private company financial statements, user bank statements, invoices, marketing documents, etc.);

(4) identifying the highest level classification documents (e.g., documents classified as highest sensitive overall type of document);

(5) calculating a weighted sensitivity score based on at least the highest level SIT documents and the highest level classification documents;

(6) determining and ranking anomaly types associated with the identified documents;

(7) determining (e.g., lookup) recommended data security policy action(s) associated with the anomaly types; and (8) recommending or implementing security policy action(s) in ranked order or highest rank.

In some embodiments, an anomaly is detected (or at least detectable) when document(s) of highly sensitive type which have highly sensitive content are was operated on with a highly sensitive activity.

In some embodiments, risk spotlighting is performed. For example, one scenario involves a high risk of unauthorized or inadvertent egress (a.k.a. exfiltration) of sensitive data 210, such as internal labeled data. No pertinent policy 134 was triggered and not alerts 458 were raised. But analysis yielded insights indicating: <number> high-confidential and <number> internal files containing <number> sensitive info were sent to suspicious domains <domain names> (e.g., file transfer domains, social media domains, unrelated business domains), <number> users accessed sensitive files containing <storage amount> of sensitive data through <number> suspicious and unallowed apps (e.g., compression apps, bitwise comparison apps). In response, the embodiment generates recommendations, and presents 1424 the recommendations together with the support context such as the insights that contribute to the risks behind the recommendations.

In some embodiments, risk spotlighting includes blind spot detection, risk scoring, and generation of policy recommendations. In some embodiments and scenarios, blind spot detection uses a unified audit log as data source, has a 28 day window, and utilizes an anomaly score calculation model which involves a dense rank times a normalized sensitivity score divided by a sum of dense rank weights. The result is subject to a box-cox transformation, producing a ranked risk score, which is subject to a sigmoid transformation, producing the anomaly score. In some scenarios, an anomaly score is calculated per-user for a given date. Some embodiments utilize a Yeo Johnson tansformation, or another power transform, in addition to, or instead of, the Box-Cox transformation.

In these examples, the normalized sensitivity score is based on a normalized risk score and a risky activity dense rank value. The normalized risk score is calculated from, e.g., a number of SIT documents (credit card, driver license, etc.), a number of trained classifier recognized documents (bank statement, budget, etc.), and a value representing SIT and machine learning results together. The dense rank is calculated from, e.g., risky activity dense rank based on values for, e.g., FileCopiedToRemovableMedia, FileAccessedByUnallowedApp, FileUploadedToSuspiciousCloud, FileAccessedBySuspiciousApp, etc.

A pseudocode example illustrating anomaly score calculation in some embodiments is provided below. This pseudocode example is not intended to stand alone, but is rather to be understood by one of skill in the art and in the context of the rest of the present disclosure (both text and Figures). In this pseudocode example, certain items are identified as follows:

Policy Log—P
Unified Audit Log—U
Classification Log—C
Base Stream—B
Date—d

Look back time—w
Suspicious Domain—sd
SuspiciousApp—sa
ClassifierMapping—m
Endpoint Policies—pe
Total Preview tenants—np
SIT—si (s1, s2 . . . sn)
Trainable classifier—ti (t1, t2, . . . tn)
Audit Activity—a
Total Users—u
User Type—ut
Activity List—al
Tenant ID—t In this pseudocode example, and also as examples of weights 524, a DENSE_RANKED_WEIGHT for various activities 522 is given below:

FileCopiedToRemovableMedia=10
FileAccessedByUnallowedApp=10
FileUploadedToSuspiciousCloud=8
FileAccessedBySuspiciousApp=8
FilePrinted=6
FileUploadedToCloud=5
SensitivityLabelRemoved=4
File TransferredByBluetooth=3
FileCopiedToNetworkShare=1
SensitivityLabelChanged=1

In this pseudocode example, code representing some score calculations 1302 and automated anomaly detection 1420 is shown below:

```
Start
Input P, U, sd, sa, m, pe, nf
Filter d for w= 28 days
    for all tenants(t) in np:
Filter a for a in al
Pt, Ut= Filter (P, U)
For all documents(d) in Ut:
Calculate SENSITIVE_INFO_HITS = CountDistinct(si, ti)
Calculate SIT_HITS= Sum(si)
Calculate MODEL _HITS= Sum(ti)
Calculate SIT_AND_MODEL_HITS = Sum (si , ti )
Calculate 25, 50, 75, 100 Percentile of SIT_ HITS as SIT25, SIT50, SIT 75,
SIT100
For all documents(d) in Ut:
Create SIT_BUCKET (SIT_ BUCKET 25, SIT_ BUCKET 50, SIT_ BUCKET 75,
SIT_ BUCKET 100 using SIT25, SIT50, SIT 75, SIT100)
For all users in u:
Assign DENSE_RANKED_WEIGHT to each activity based on the order of risk
For all activity in a:
Assign SIT_WEIGHT for each SIT_BUCKET as SIT_ BUCKET 25 = 0.1, SIT_
BUCKET 50 = 0.2, SIT_ BUCKET 75 = 0.3, SIT_ BUCKET 100 = 0.4
Calculate SIT_SCORE = SIT_WEIGHT * SIT_BUCKET
Assign weights to every SIT/Model hit as SENSITIVITY_WEIGHT SIT = 0.2,
SENSITIVITY_WEIGHT MODEL = 0.4, SENSITIVITY_WEIGHT SIT&MODEL =
0.4
Calculate SENSITIVITY_SCORE = SUM (SENSITIVITY_WEIGHT SIT *
SIT_SCORE), (SENSITIVITY_WEIGHT MODEL * MODEL_HITS),
(SENSITIVITY_WEIGHT SIT&MODEL * SIT_AND_MODEL_HITS)
For each ut:
Calculate CUT_OFF = if SENSITIVE_INFO_HITS > Percentile
(SENSITIVE_INFO_HITS, 0.5) then 1 else 0
Calculate MEAN_SENSITIVITY_SCORE = Percentile (SENSITIVITY_SCORE,
0.5)
Calculate WEIGHTED_AVERAGE_SCORE =
SENSITIVITY_SCORE/MEAN_SENSITIVITY_SCORE
Calculate NORMALIZED_SENSITIVITY_SCORE = Min-max
(WEIGHTED_AVERAGE_SCORE)
Calculate CUT_OFF = max (CUT_OFF)
Calculate RANKED_RISK_SCORE = NORMALIZED_SENSITIVITY_SCORE *
DENSE_RANKED_WEIGHT
Calculate SUM_RANKED_RISK_SCORE = Sum (RANKED_RISK_SCORE)
```

-continued

```
Calculate COMBINED_ANOMALY_SCORE = SUM_RANKED_RISK_SCORE /
Sum (DENSE_RANKED_WEIGHT)
Calculate ANOMALY_SCORE = BoxCox (COMBINED_ANOMALY_SCORE)
Calculate SIGMOID_SCORE = Sigmoid (ANOMALY_SCORE)
If SIGMOID_SCORE > 0.9 and CUT_OFF ==1:
    ANOMALY = 1
Else:
    ANOMALY = 0
End
```

Continuing the examples, policy recommendation generation in these examples includes grouping anomalies into different categories which are treated separately based on the risk (#Users, #Files, #Workloads, etc.) involved by the anomalous pattern. For instance, a view of one grouping is shown in Table 1 below:

| Anomaly Type | Load | Operations | Policy |
|---|---|---|---|
| Exfil by anonymous links | SP, OD | AnonLinkCreated AnonLinkUpdated AnonLinkUSed | Create policy restricting user sharing files with "Anyone with link" option |
| Exfil through device | E | FileAccessedByUnallowedApp FileCopiedToClipboard FileCopiedToNetworkShare FileCopiedToRemoteDesktopSession FileCopiedToRemovableMedia File TransferredByBluetooth FileUploadedToCloud FilePrinted | Create policy with Endpoint options. Based on order of risky operations, block or audit. |
| Exfil through file or folder operation | SP, OD | FileDownloaded FileMoved FolderMoved | Only investigate. Policy to monitor external sharing. |
| Exfil through email or message | Ex, T | Send MessageSent | Create policy to restrict sharing credentials, source code |
| Anomalous sensitivity label changes | SP, OD, Ex, T | FileSensitivityLabelChanged FileSensitivityLabelRemoved SensitivityLabelChanged SensitivityLabelRemoved SiteSensitivityLabelChanged SiteSensitivityLabelRemoved | Only investigate. |

In Table 1, "Exfil" means Exfiltration, SP means SharePoint®, OD means OneDrive®, Ex means Exchange®, T means Teams®, and E means Endpoint (marks of Microsoft Corporation). Two additional columns are present but are not shown in Table 1, due to space limits and formatting requirements. One column not shown in Table 1 is headed "SIT/TC to target", meaning which sensitive information type 418 or trainable classifier 442 to target. In this column, an entry for each Exfiltration row is "Top 3 SITs, top 3 TCs, or 3 SIT+TCs covering max #files exfiltrated"; the entry for the Anomalous sensitivity label changes row is blank. The sixth column, also not shown in Table 1 is headed "Mode". In this column, an entry for each Exfiltration row is "Enforce"; the entry for the Anomalous sensitivity label changes row is blank.

Continuing the examples, and consistent with the high-level view of grouping shown in Table 1 and discussed above, one recommendation per Anomaly group is generated based on the #files exfiltrated for a tenant and the sensitive content at risk. A high-level pseudocode illustrating generation is shown below:

```
Start:
    For every Anomaly in AnomalyGroup:
        Filter UnifiedAuditLog where CLASSIFIER_TYPE == "OOB"
        Calculate PERCENT_ANOMALY_FILES =
    CountDistinct(ANOMALY_FILES)/CountDistinct(OBJECTID)
        For every CLASSIFIER_ID:
            Calculate COUNT_FILES = CountDistinct(OBJECTID)
            Filter CLASSIFIER_ID where COUNT_FILES > Percentile
    (COUNT_FILES, 0.1)
            Filter CLASSIFIER_ID where PERCENT_ANOMALY_FILES >
            20%
            Filter CLASSIFIER_ID Not in ExistingPolicyConfig
            Sort by ANOMALY_FILES desc
            For each type in CLASSIFIER_TYPE
                Filter Top 3 CLASSIFIER_ID
            Pick Top 3 CLASSIFIER_ID
End
```

Some embodiments provide or utilize policy tuning 1440, also referred to as policy finetuning, intelligent policy tuning, or intelligent policy finetuning. This is represented in data flow whereby policy settings and classification logs go via update-policy to insights and recommendations, classification logs also go via new-policy to insights and recommendations, and audit information goes to insights and recommendations. A pseudocode illustrating policy tuning is shown below, beginning with some notation:

CL→Classification logs

Ps→Policy settings

Pi→Policy I of tenant/customer

Si→SIT I tuned in a policy

Mi→Model id

Policy Log—P

Unified Audit Log—U

Classification Log—C

Base Stream—B

Date—d

Look back time—w

ClassifierMapping—m

Total Preview tenants—np

SIT—si (s1, s2 . . . sn)

Audit Activity—a

Total Users—u co-occurrence matrix→Sit_I, M_I occurrence frequncy

Ri→Rule I of Policy (Pi)

Recom (i)→Recommendations at rule

Recom (p)→Policy level recommendations

As with all of the other pseudocode provided herein, the following pseudocode example is not intended to stand alone, but is rather to be understood by one of skill in the art and in the context of the rest of the present disclosure (both text and Figures).

```
Start
    Input CL, Ps, U, Si, Mi, m
    Filter d for w= 28 days
        For each tenant:
        Pt, C = Filter (P, CL)
        For all documents(d) in C:
        Calculate SENSITIVE__INFO__HITS = CountDistinct(Si, Mi)
        Calculate SIT__HITS= count(Si)
        Calculate MODEL __HITS= count (Mi)
        Calculate SIT__AND__MODEL__HITS = count (Si , Mi )
        If Ps exists:
            For each Pi:
            For each Ri:
            Recom(i ) <- Identify frequently occurred Mi with Si from
        SIT__AND__MODEL__HITS
            Generate Recom(p)
            Calculate DLP FP reduction %
            Suggest which has high FP reduction
        If no policy exists:
            Recom(p,ML) <- Max (MODEL __HITS)
            if Recom(p, ML) not present
                Recom(p,SIT) <- Max(SIT__HITS) at least 3 SITS
            create new policy with recom(p) and policy configs
End
```

Some embodiments provide or utilize a base job for creating a base stream 318, also referred to a base stream data 318. In an example involving a unified audit log and classification logs as data sources, and a 1 hour window, this job is represented in data flow whereby unified audit logs are filtered to retain only operations on data thus producing filtered unified audit logs, and the filtered unified audit logs and classification logs flow into the base stream.

Pseudocode representing the base job is shown below:

```
Start
    Input U, C
    Filter d for w=1 hour
    B = empty
    for all tenants(t) in np:
        Ut, Ct = Filter(U, C) for t
        Bt = empty
        For a in Ut:
            If a is a data operation:
                d = Data associated with a
                c = Classification signals for d in Ct
                Add a ∪ c to Bt
        B = B ∪ Bt
End
```

Some embodiments provide analytics and a recommendation engine for data governance and data management tools. Data security and protection of sensitive and proprietary information and preventing misuse and harmful exfiltration is important. However, in some scenarios admins don't know where to start and what to prioritize in the vast and heterogeneous data they handle. Even if they are able to start with something, they don't know if it is enough and whether the roadmap will be effective and complete. Unpacking data of such magnitude and complexity is facilitated by a suitable set of analytics that help admins draw meaningful conclusions on the current state of data security and crucial gaps.

Analytics alone are not necessarily actionable for the admins who view them. Time is of essence for admins, especially when organizations are suffering from a severe talent shortage. Accordingly, teachings herein are applied in embodiments that translate analytics into a set of prioritized and actionable recommendations.

Some embodiments utilize or provide an end-to-end solution to the admin problem of onboarding to data security.

Some start with a set of curated analytics and insights which prominently surface the risks and vulnerabilities across the digital estate. These analytics carry information related to the volume or magnitude of the risk, identify of the impacted users, identity of sensitive files at risk, and implications if this risk is not addressed. These analytics are "spotlighted" which means they carry the prominent visual cues to divert or direct the admin's attention to the urgent analytics and recommendations. In some embodiments, each of these risk spotlights includes an option to help admins understand the evidence, e.g., the list of top N users, files, actions which are contributing to the risks. One-Click Actionable Recommendations carry prescriptive recommendations which are easy to act on. In some embodiments, feedback from the admin on whether they completed, dismissed, or placed in-review the recommendations is fed back to a prioritization logic to help ensure that only recommendations which are highly valuable are shown to the admin.

In some embodiments and scenarios, analytics and recommendations are generated for every tenant at a weekly cadence and saved for the fourth week. The roster schedule and logic is built such that high ranked recommendations are shown bright and big on a portal with a visual cue. All other recommendations are sent to a queue. At a defined time per week, there are, e.g., seven categories of recommendations, including: risk spotlighting and remediation with policies, risk spotlighting and remediation using incident management, policy finetuning to reduce noise, policy finetuning to reduce or expand the scope of policies, expanding existing policies to leverage premium features, fingerprinting to discover blind spots and dark or unlabeled data, insights on regulatory risks and recommendations to improve posture.

In some embodiments and scenarios, there is a three-way prioritization logic to avoid overlooking any risks. There are multiple algorithms to generate the above analytics and recommendations. These algorithms cover an entire customer journey starting from onboarding to deep usage to retention. Each algorithm has a logic built to ensure it prioritizes its own output to surface the highest priority output. There is a prioritization logic across algorithms so the highest value is ranked higher. Across these seven (for example) categories, there is prioritization again to ensure top two (for example) are shown and the rest are pushed to the queue.

In some embodiments, a recommendation engine is consistent with a data flow from Raw Data to Enriched Data to Machine Learning (ML) Algorithm Engine to Prioritization Logic to Output Store to API Layer Find and Save to Recommendation Store. API Layer Find and Save also flows to Telemetry from User Experience (UX) to Monitor System Efficacy, and from that Telemetry to Recommendation Store. Constituents of Raw Data include Activity Data, Policy Data, Classification Data, User Profile, and Tenant Profile. Constituents of Enriched Data include Preprocessed, Cost optimized, and Standardized, with associated 24 hour batch job. Constituents of ML Algorithm Engine include Anomaly Detector, Risk Spotlighting, Alert Spotlighting, Policy Tuner, Dark Data Discovery, Labeling Blind Spots, Shadow Clusters, and Anomalous Sequence. Constituents of Prioritization Logic include User Risk, Data Risk, Location Risk, and Other Indicators. The Telemetry flows to Analytics Dashboard, which has constituents Priority Cards/Widgets, Recommendation Queue, Action Pane, and Learn More.

In some embodiments and scenarios, each customer gets from one to seven analytics and recommendations once per week. Each analytic/recommendation is contextual and takes into account prior recommendations. Stats of recommendations are saved. Customers can reject a recommendation, and that feedback is taken into account while generating more recommendations.

In some embodiments and scenarios, a system 202 produces the following: a set of data protection analytics customized to a tenant context, including analytics that surface the top vulnerabilities, data protection gaps, and other risks in the tenant environment; corroborative evidence so that the customer can understand the extent and nature of these risks; and prescriptive recommendations on the action or configuration suitable to address each risk.

In some embodiments, a risk 402 is defined as a function of non-typical or otherwise anomalous data and user operations that have happened in the tenant. For instance, if some operation is happening frequently and is very typical for the tenant, such as interacting with customers using email and exchanging credit card numbers, then these do not present data protection risks or data security risks. Whereas sending of such information to a messaging app is non-typical and indicative of data security risks. Hence the system identifies risks and generates useful analytics and recommendations.

In some embodiments, a Data Platform includes a source of the data used for Analytics. The data source is centralized, compliant, elastic, queryable and callable. To implement the Data Platform, some embodiments first identify the data sources to be used to generate analytics for the tenant/customer. Some example data sources which help admins understand a data protection state of the customer are: Activity data (e.g., how are files handled, egressed, shared between departments, etc.), Classification data (e.g., what is the category of files, are they sensitive, do they contain proprietary information, etc.), Policy data (e.g., what data protection policies are already configured and what type of risks do they address), User profile data (e.g., who are the users in the customer organization, what are their profiles), and Tenant profile data (e.g., what industry, geography of the tenant, etc.).

In some scenarios, the data for each tenant is distributed across different forests for storage and compute optimization. However, each of these data entities have a common, extensible, unified schema which supports all types of data that are present in the tenant, e.g., files, emails, conversations, etc.

Some algorithms rely on access to a perennial source of this data. Because this data generally cannot be readily used in the raw format, this data is enriched into the Base Stream 318. The Base Stream is an amalgamated source of information that connects the data points so there is a single narrative that explains these data entities. For instance, in some embodiments the Base Stream has a unique identifier from each of the above data entities. Against this unique identifier, the various data fields are populated so that by querying or using this identifier a single source of truth (in the data processing sense) can be fetched across all these data entities. In some scenarios, Base Stream is also used to optimize the costs, because fetching each data entity mentioned above and running jobs to integrate with the others is often a computationally expensive operation.

In some embodiments, a model development platform leverages HDInsight Clusters or similar technology deployed on the above data platform for ML model development. In some, the algorithms are developed using PySpark or similar technology. In some, these algorithms are developed in a pre-production environment which is secure, compliant, and anonymized. In some, model development is guided by certain principles, as it provides capability to accommodate various categories of algorithms to identify risks and generate recommendations. To help ensure the output is easily consumable for the customer, and to facilitate to standardization and scaling, each of the algorithms or models abides by the following principles: the output schema is standardized across all algorithms; each algorithm outputs both analytics and connected recommendations; and each algorithm generates a priority for its output, permitting the top outputs to be surfaced for immediate attention while the rest are taken to a queue for potential later viewing.

In some scenarios, model development includes identifying the data fields from the base stream which have a relevance to a given use-case, e.g., data protection. For example, in some environments activity data has dozens of operation types, not all of which are inherently of value to a system 202. Generally, file-name-changed is not useful but file-sent-to-cloud is useful, for example.

In some scenarios, feature engineering performs featurization of the data fields so that models can read and perform ML operations on those features. For instance, some embodiments create features such as "volume of sensitive info for every identified operation", or "presence or absence of policy for that sensitive info for that operation".

Once the features are developed, each file is scored for sensitivity. This sensitivity or risk score is calculated based on multiple parameters such as sensitive content of the file and relevance of that sensitive content to the customer. For instance, patient health data for a medical company is more risky than source code for a medical company.

Aggregation is performed at certain pivots to aid understanding of the magnitude of risk involved. In some scenarios, this aggregation is done at a user level and a date level. For instance, some aggregation indicates per day, how many users have accessed sensitive info by uploading to cloud and how much volume is occupied by that sensitive info.

In some scenarios, a Risk Score is computed at a user level taking into account the sensitivity score and aggregation. In some, a primary Risk Score answers the question: What is the risk of the operation performed by the user on the sensitive data?

In some scenarios, Anomaly Scoring takes into account risk score(s) and sensitivity score(s) to identify one or more anomalies. Some embodiments have a dense ranking mechanism for every operation, which attaches weights to user operations. Some do statistical preprocessing to arrive at an anomaly score between 0 to 1 for every user, and some apply a defined percentile cut-off to identify the anomalous users.

Some embodiments perform an internal prioritization within an algorithm. The above steps are not inherently single-path in nature; for each operation, there are potentially multiple anomalous users and potentially multiple such data operations. Prioritization facilitates surfacing those that optimally receive immediate attention. For each output produced by the algorithm as explained above a priority score is computed. This priority score is a function of the channel (e.g., endpoint versus email), and type of sensitive data (e.g., labeled, type of sensitive data, users detected).

With regard to some embodiments, algorithm queue generation and output of multiple insights is repeated across multiple algorithms in a manner consistent with the following: identify the data sources; build pre-processing logic and generate streamlined data; formulate the customer scenario, e.g., highlight risks and blind spots, or highlight opportunities for finetuning policies, or highlight events for rapid attention, etc.; invoke or build ML logic to meet the above customer scenario; take into account prioritization within the algorithm so that the most impactful insights are surfaced to the customer.

Some embodiments perform prioritization across multiple algorithms. Since the storage is designed to output a maximum of 7 (for example) categories of insights per week, across the algorithms a prioritization is performed to roster these 7. Some of the indicators of priority include: sensitive data matching certain highly accurate classifiers are given priority over others; certain workloads which are the most vulnerable from a data security perspective such as endpoint are given priority; volume of users in scope is a factor, e.g., if the insight targets a large set of users, it means a higher magnitude of risk and prioritized over the others; if an insight targets a high frequency behavior (multiple instances), that is given priority over the others. In some embodiments, one or more of these factors are fed into a prioritization logic as parameters, which accordingly surfaces up to 7 results (this cap is extensible based on storage and compute) per week per customer.

Some embodiments write insights in a standard schema so the end-to-end pipeline is fully automated and can be leveraged across multiple scenarios and customer use-cases. One standard output schema has been identified for the ADLS 824 and Kusto stores 1010 utilized in example architectures. This schema includes: insight title, insight category, evidence schema, policy schema, priority, date of creation.

Architecture Examples

FIGS. 8 through 12 provide further illustration in the form of example architectures. This collection of examples architectures is not presented as exhaustive, or as prescriptive. Like the pseudocode and other detailed examples presented herein, the example architectures are not intended to stand alone, but are rather to be understood by one of skill in the art and in the context of the rest of the present disclosure (both text and Figures).

Although not shown fully due to space limits and formatting requirements, the FIG. 8 example architecture 800 includes: 0-labeled read arrow from logs 826 to input consolidator, 1-labeled write arrow to tenant label cache 828 and base stream consolidated logs 830, 2-labeled read arrows from insight generator 816 to base stream consolidated logs 830 and machine learning rules 832, 3-labeled write arrow to RO events 834 from insight generator 816, 4-labeled write double arrow between RO events 834 and insights 820 via event grid configurator 836, 5-labeled get/post arrow from admin portal 804 to recommendation API 808, 6-labeled read arrows from data provider 810 to insights 820 and preferences 822, and 7-labeled write arrow from data provider 810 to preferences 822.

In the context of the example architectures, a double arrow is a bidirectional arrow; other arrows are unidirectional in the indicated direction. Also, a 3-labeled write arrow, for example, is an arrow labeled with "3" and "write".

In the FIG. 8 example architecture, an example of user experience 802 is SCC UX, e.g., security control center (or security and compliance center) user experience. An example of cloud filtering service 806 is EOP DI Service, that is, a Web Service hosted in EOP, where EOP is a data center and DI stands for Data Insights. The Web Service exposes Rest APIs for data retrieval from data sources like SQL, Kusto (in Azure), Elastic Search etc. This has recently been renamed to EOP Rest APIs. An example of data provider 810 is a Kusto data provider. An example of data platform 320 is CDP Azure® (mark of Microsoft Corporation), where CDP means customer data platform. An example of large dataset cluster 812 is CDP Hadoop® Cluster (mark of The Apache Software Foundation). An example of input consolidator 814 is PySpark Batch Job (BaseStream Input Consolidator). An example of insight generator 816 is PySpark Batch Job (Smart Insight Generator). An example of data store 818 is CDP Kusto Storage. An example of insights 820 is SmartInsight Table. An example of preferences 822 is Tenant Preferences Table. An example of data lake storage 824 is CDP ADLS Storage, where ADLS is Azure® Data Lake Storage (mark of Microsoft Corporation). An example of logs 826 is one or more of Enriched Audit Logs, Policy Config Logs, Classification Document Logs, Classification Mail Item Logs. An example of tenant label cache 828 is Tenant Label Names Cache. An example of base stream consolidated logs 830 is Compliance Base Stream Consolidated Logs. An example of RO events 834 is Recommendation Object Events. An example of event grid configurator 836 is CDP Event Grid Config.

Although not shown fully due to space limits and formatting requirements, the FIG. 9 example architecture 900 includes: 1-labeled CRUD arrow from admin portal 804 to analytics API 902, where CRUD stands for create, read, update, delete, 2-labeled CRUD arrow from data provider 810 to objects 906, 3-labeled periodic poll arrow from exporter 910 to objects 906, 4-labeled write arrow from exporter 910 to event hubs 914, 5-labeled read arrow from configuration reader 922 to event hubs 914, 6-labeled read arrow from downloader 916 to setting objects 906, and 7-labeled read arrow from configuration reader 922 to setting objects 906. FIG. 9 illustrates an end-to-end flow with an opt-in feature. This opt-in feature allows customers to opt-in to functionality 204, such that rich insights and analytics are by default presented to the customers only if they have opted-in. FIG. 8 illustrates an architecture providing functionality 204 which includes insight generation and presentation.

In the FIG. 9 example architecture, an example of cloud filtering service 806 is EOP, an example of analytics API 902 is MipAnalyticsTenantSettings DI APIs, an example of database 904 is DI Sql Directory DB (Sql a.k.a. SQL is a query language, DB means database), an example of objects 906 is MipAnalyticsTenantSettings Objects, an example of periodic job 908 is Periodic Background Job, an example of analytics setting 918 is MipAnalyticsTenantSettings, an example of configuration reader 922 is UnifiedConfigReader, and an example of big data pipeline 924 is DI Azure® (mark of Microsoft Corporation), which refers to a big data processing pipeline hosted in Azure® offerings (it is a combination of streaming and batch spark jobs and corresponding input and output storages).

Figure 10:
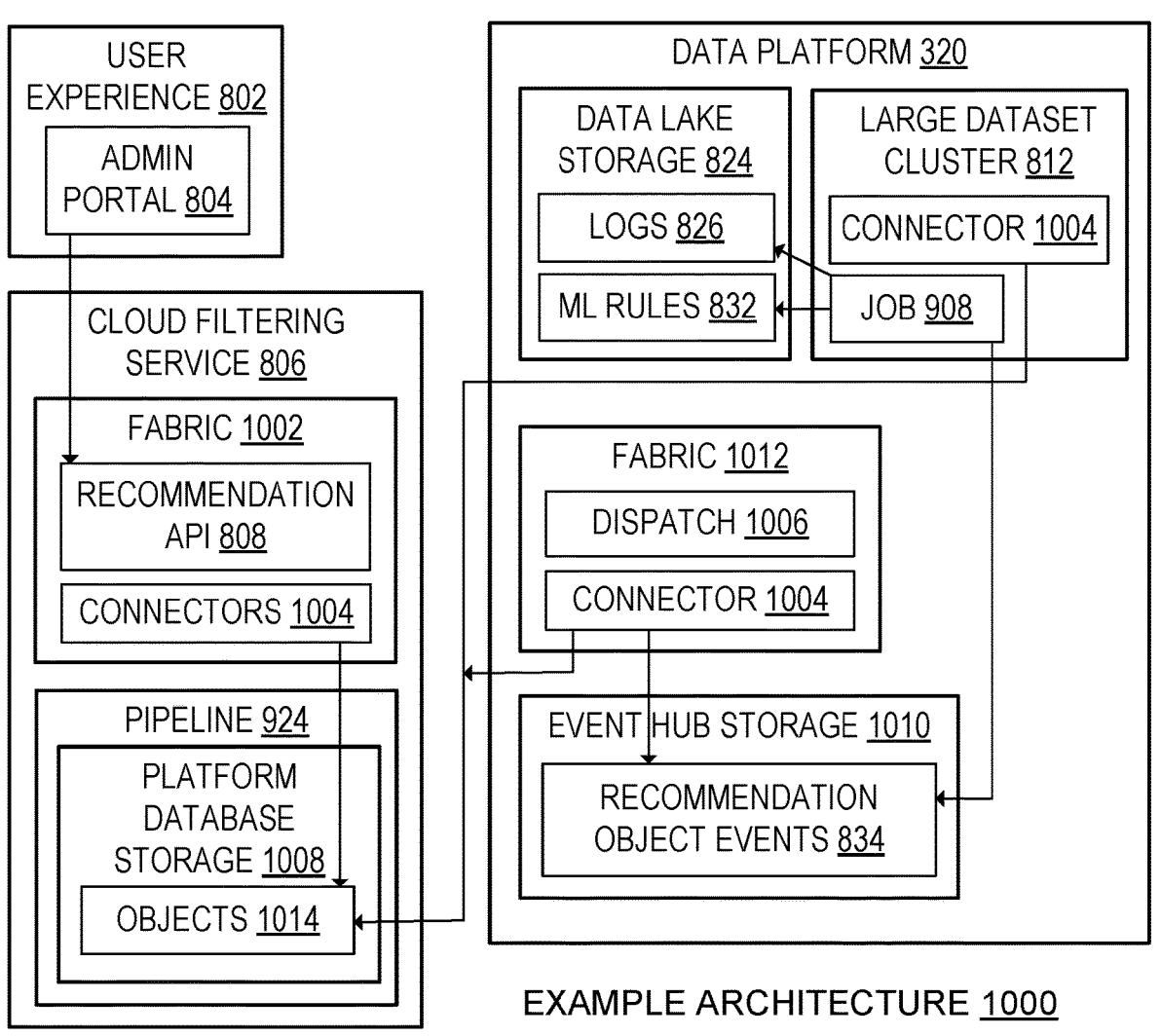
FIG. 10 is an architecture diagram illustrating aspects of a third example architecture suitable for embodying dynamic security policy generation functionality.

Although not shown fully due to space limits and formatting requirements, the FIG. 10 example architecture 1000 includes: 1-labeled read arrow from job 908 to logs 826, 2-labeled read arrow from job 908 to ML rules 832, 3A-labeled write arrow from connector 1004 to objects 1014, 3B-1-labeled write arrow from job 908 to recommendation object events 834, 3B-2-labeled read arrow from connector 1004 to recommendation object events 834, 3B-3-labeled write arrow from connector 1004 to objects 1014, 4-labeled get/post arrow from admin portal 804 to recommendation API 808, and 5-labeled write arrow from connector 1004 to objects 1014.

In the FIG. 10 example architecture, an example of fabric 1002 is Scope Platform Service Fabric Web Services, an example of connector 1004 is a pair .NET Connector (Read) and .NET Connector (Write) or an individual .NET Connector, an example of dispatch 1006 is Dispatch Service, an example of platform database storage 1008 is Score Platform CosmosDB Storage, an example of event hub storage 1010 is CDP EventHub Storage, an example of fabric 1012 is CDP Service Fabric, and an example of objects 1014 is recommendation object collection.

Figure 11:
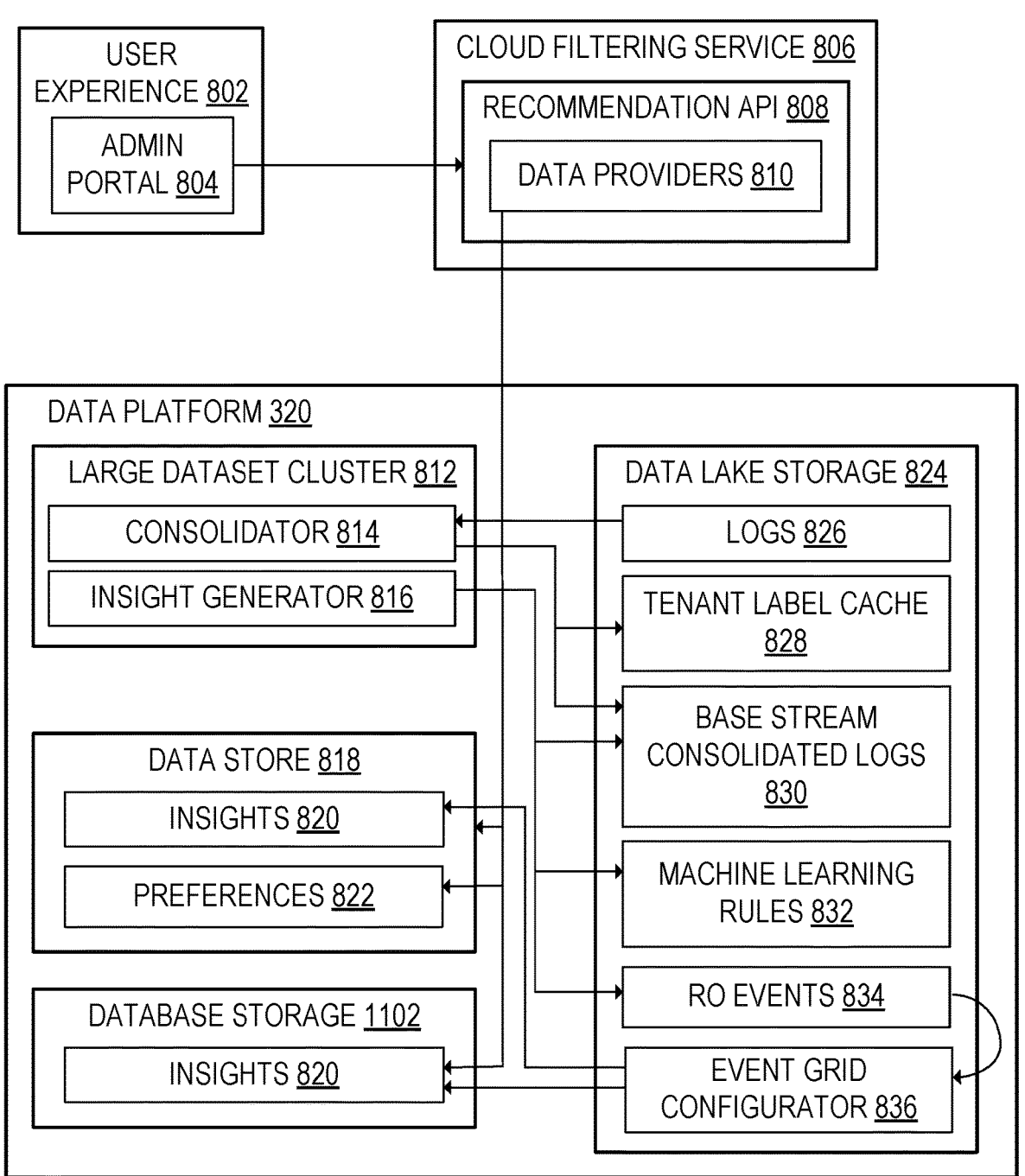
FIG. 11 is an architecture diagram illustrating aspects of a fourth example architecture suitable for embodying dynamic security policy generation functionality.

Although not shown fully due to space limits and formatting requirements, the FIG. 11 example architecture 1100 includes: 0-labeled read arrow from logs 826 to consolidator 814, 1-labeled write arrow from consolidator 814 to tenant label cache 828 and base stream consolidated logs 830, 2-labeled read arrows from insight generator 816 to base stream consolidated logs 830 and machine learning rules 832, 3-labeled write arrow to RO events 834 from insight generator 816, 4a-labeled arrow from RO events 834 to event grid configurator 836, 4b-labeled arrow from event grid configurator 836 to insights 820, 5-labeled get/post arrow from admin portal 804 to recommendation API 808, 6-labeled read arrow from data providers 810 to data store 818, 6*-labeled read arrow from data providers 810 to database storage 1102, 7-labeled write arrow from data providers 810 to data store 818, and 7*-labeled write arrow from data providers 810 to database storage 1102.

In the FIG. 11 example architecture, an example of database storage 1102 is CDP CosmosDB Storage.

Figure 12:
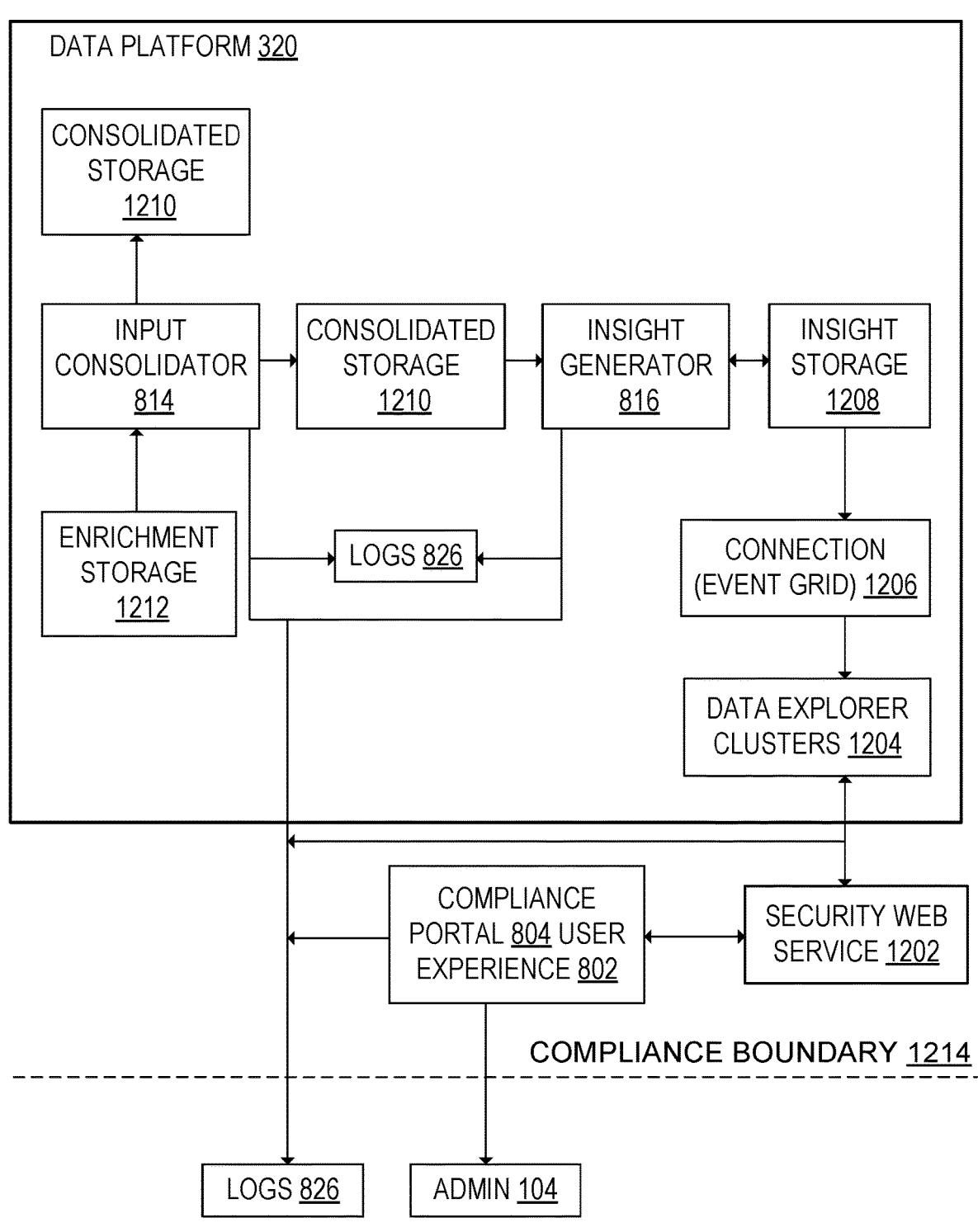
FIG. 12 is an architecture diagram illustrating aspects of a fifth example architecture suitable for embodying dynamic security policy generation functionality.

Although not shown fully due to space limits and formatting requirements, the FIG. 12 example architecture 1200 includes error logs labels on the arrows into the logs 826 at the bottom of FIG. 12, and the following example retention labels: 30 days retention on logs 826 at the bottom of FIG. 12, 30 days retention on data explorer clusters 1204, 90 days retention on insight storage 1208, 30 days retention on the consolidated storage 1210 between input consolidator 814 and insight generator 816, and 30 days retention on consolidated storage 1210 above input consolidator 814.

In the FIG. 12 example architecture, an example of logs 826 at the bottom of FIG. 12 is Geneva Logs, an example of security web service 1202 is EOP DI Web Service, an example of data explorer clusters 1204 is Azure® Data Explorer Clusters Primary and Pair (Kusto), an example of insight storage 1208 is SmartInsight Storage (ADL Gen2) where ADL means Azure® data lake, an example of consolidated storage 1210 is ADL Gen2, and an example of enrichment storage 1212 is ADL Gen2.

Some Sample Calculations

FIGS. 15 through 19 provide further illustration of score calculations taught herein. FIG. 15 shows some sample data. FIG. 16 illustrates sensitivity buckets for the FIG. 15 sample data. Specifically, FIG. 16 illustrates creating SIT 418 buckets at a document level for a consolidated score for every document. After the FIG. 16 calculations, processing aggregates records at User Type, UserID, Date, and Activity Level. This includes assigning bucket weights: SIT25 0.1, SIT50 0.2, SIT75 0.3, SIT100 0.4. This also includes assigning weights to SIT, ML, SIT+ML (also denoted SIT&ML): SIT 0.2, ML 0.4, SIT&ML 0.4. FIG. 17 illustrates aggregate records for the FIG. 15 sample data. FIG. 18 illustrates risk scores or their constituents for the FIG. 15 sample data. Specifically, FIG. 18 illustrates calculating various scores based on the Sensitive documents handled by the Users. Processing also includes assigning dense rank weight-descending order of risk associated with each activity: a1 2, a2 1. FIG. 19 illustrates anomaly scores for the FIG. 15 sample data. Specifically, FIG. 19 illustrates calculating Anomaly Score based on the risks associated with all the activities.

Internet of Things

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as document classification 304 by machine learning 308, base data streaming 318, digital data security 132 in computing systems 102, and data exfiltration 430 from computing systems 102, which are each an activity deeply rooted in computing technology. Some of the technical mechanisms discussed include, e.g., security anomaly detectors 214, security policy generators 218, machine learning feature engineers 312, base stream data platforms 320, cloud-based filtering services 806, administrative portals 804, data lake storage 824, big data pipelines 924, and various computing system architectures in FIGS. 1, 2, 3, and 8-12. Some of the technical effects discussed include, e.g., current cybersecurity risk scores 404, security policy recommendations 216, surfacing 1424 of ranked 1414 policy action recommendations, tuned 1440 cybersecurity policies, and closed 1442 security gaps in computing systems 102. Thus, purely mental processes and activities limited to pen-and-paper are clearly excluded. Other advantages based on the technical characteristics of the teachings will also be apparent to one of skill from the description provided.

One of skill understands that cybersecurity generally is a technical activity which cannot be performed mentally, because it requires reading megabytes or even gigabytes of computing system memory 112. As disclosed herein, dynamic security policy generation also involves writing computing system memory 112, which cannot be performed mentally or manually. Moreover, mental or pen-and-paper activity cannot machine learning 308 operations as described herein. One of skill also understands that attempting to perform dynamic security policy generation manually would create unacceptable delays in program execution, pose security risks, and introduce a severe risk of human errors that can cause programs to crash or violate IT policies. Manual review of data and manual drafting of policies is insufficient in systems 102 that include megabytes of sensitive data 210 which is subject to change hourly. People manifestly lack the speed, accuracy, memory capacity, and specific processing capabilities required to perform dynamic security policy generation 1400.

In particular, dynamic security policy generation as taught herein is a part of computing technology. Hence, the dynamic security policy generation improvements such as functionality 204 described herein are improvements to computing technology.

Different embodiments provide different technical benefits or other advantages in different circumstances, but one of skill informed by the teachings herein will acknowledge that particular technical advantages will likely follow from particular embodiment features or feature combinations, as noted at various points herein. Some examples include anomaly prediction 214, one-click policy creation 1306, insights cards (a.k.a. recommendations 216), and policy finetuning suggestions (216). Any generic or abstract aspects are integrated into a practical application such as onboarding tools for data governance or data management or both, e.g., Microsoft Purview™ offerings (mark of Microsoft Corporation) or similar offerings.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to mitigate gaps in data sensitivity labeling, how to accurately assess exfiltration activity risks, how to relieve burdens on security personnel and network/system admins, how to leverage machine learning while mitigating fabrication impact, and how to facilitate effective use of tools for data governance or data management or both. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present subject matter, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
JSON: JavaScript® Object Notation (mark of Oracle America, Inc.).
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network
YAML: yet another markup language, or YAML ain't markup language Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin (x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 136 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Dynamic security policy generation operations such as calculating 1302 risk scores, generating 1304 security recommendations, determining 1402 document distributions, ranking 141 security recommendations, detecting 1420 anomalies 212, and many other operations discussed herein (whether recited in the Figures or not), are understood to be inherently digital. A human mind cannot interface directly with a CPU or other processor, or with RAM or other digital storage, to read and write the necessary data to perform the dynamic security policy generation steps 1400 taught herein even in a hypothetical or actual prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, analyzing, ascertaining, calculating, categorizing, classifying, closing, collecting, configuring, connecting, creating, detecting, determining, downloading, filtering, generating, grouping, identifying, implementing, labeling, learning, linking, listing, managing, mitigating, obtaining, presenting, printing, prioritizing, ranking, reading, recommending, securing, storing, streaming, training, transferring, transforming, tuning, uploading, utilizing, weighting, writing (and accesses, accessed, analyzes, analyzed, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware

102 computer system, also referred to as a "computational system" or "computing system", and when in a network may be referred to as a "node"

104 users, e.g., user of an enhanced system 202

106 peripheral device

108 network generally, including, e.g., LANs, WANs, software-defined networks, clouds, and other wired or wireless networks

110 processor or set of processors; includes hardware

112 computer-readable storage medium, e.g., RAM, hard disks

114 removable configured computer-readable storage medium

116 instructions executable with processor; may be on removable storage media or in other memory (volatile or nonvolatile or both)

118 digital data in a system 102; data structures, values, source code, and other examples are discussed herein

120 kernel(s), e.g., operating system(s), BIOS, UEFI, device drivers; also refers to an execution engine such as a language runtime

122 software tools, software applications, security controls; computational

124 digital documents, e.g., files, collections of files, blobs, other identified units of digital data

126 display screens, also referred to as "displays"

128 computing hardware not otherwise associated with a reference number 106, 108, 110, 112, 114

130 user interface in a computing system

132 security in a computing system, e.g., confidentiality, integrity, availability, or privacy of data 118, or computational activity taken to measure or track or provide or adapt such aspects of data 118; also referred to as cybersecurity

134 security policy, e.g, guidance, mechanisms, conditions, rules regarding security

136 cloud, also referred to as cloud environment or cloud computing environment

202 enhanced computing system, i.e., system 102 enhanced with functionality 204 as taught herein

204 dynamic security policy generation functionality (also referred to as "functionality 204"), e.g., software or specialized hardware which performs or is configured to perform steps 1302, 1304, and 1308, or steps 1302, 1306, and 1308, or steps 1304 and 1418, or steps 1306 and 1418, or step 1428 or step 1430 to enable one or more of the foregoing, or any software or hardware which performs or is configured to perform a novel method 1400 or a computational security policy generation functionality activity first disclosed herein

206 computationally measure or track or provide or adapt security 132 in a computing system

208 managed computing system 102 (a device 101 is an example of a system 102)

210 sensitive data 118 (a.k.a. sensitive information), e.g., data which is confidential, proprietary, subject to governmental regulation, subject to compliance, subject to entity policy, or otherwise distinguished from public data generally

212 security anomaly, as present or found or represented in a computing system 102

214 security anomaly detector; computational (as opposed to manual or mental)

216 security policy recommendation (a.k.a. suggestion), as present or found or represented in a computing system 102

218 generator (computational) of security policy or security policy recommendation in a computing system 102, or component thereof

302 document distribution, as present or found or represented in a computing system 102; also refers to computational activity of determining such a distribution

304 document classification, as present or found or represented in a computing system 102; also refers to computational activity of determining such a classification

306 recommendation or policy ranking, as present or found or represented in a computing system 102; also refers to computational activity of determining such a ranking

308 machine learning; computational

310 machine learning feature; digital

312 machine learning feature engineer; computational

314 computational activity, a.k.a. behavior

316 weight of a computational activity, relative to other computational activity (ies)

318 base stream data; digital; also referred to as base stream source data, base stream, base data streaming

320 base stream data platform; computational

322 anomaly category, as present or found or represented in a computing system 102

324 interface generally in a computing system; computational, digital

402 security risk, as present or found or represented in a computing system 102; digital

404 security risk score representing a risk 402, as present or found or represented in a computing system 102; a given risk may have zero, one, or more corresponding scores; 404 also refers to computational activity of scoring (calculate score, assign score, or both)

406 security risk scoring mechanism; computational

408 managing computing system

410 sensitivity of data or document, as present or found or represented in a computing system 102; digital

412 sensitivity score; digital

414 dense ranked weight; digital

416 combined anomaly score; digital

418 sensitive information type (SIT) or other sensitivity label; digital

420 box cox transformation (a.k.a. transform), as present or found or represented in a computing system 102; computational activity; also refers to digital result of such activity

422 transformation generally, as present or found or represented in a computing system 102; computational activity; e.g., box cox, yeo johnson, or sigmoid transformation

424 sigmoid transformation (a.k.a. transform), as present or found or represented in a computing system 102; computational activity; also refers to digital result of such activity

426 mitigation, e.g., harm reduction or harm avoidance, as present or found or represented in a computing system 102

428 mitigation action in a computing system, e.g., action or setting which mitigates against harm or lowers risk

430 exfiltration of data from a location; computational activity or result thereof, as present or found or represented in a computing system 102

432 sensitivity group, as present or found or represented in a computing system 102

434 classification group, as present or found or represented in a computing system 102

436 anomaly type, as present or found or represented in a computing system 102

438 security policy action, as present or found or represented in a computing system 102

440 machine learning training or result thereof, as present or found or represented in a computing system 102

442 machine learning model trained for classification, a.k.a. classifier

444 collection of documents or computational activity of collecting documents, as present or found or represented in a computing system 102

446 anonymous link, as present or found or represented in a computing system 102

448 file or folder, as present or found or represented in a computing system 102

450 sensitivity label, as present or found or represented in a computing system 102

452 change to sensitivity label, as present or found or represented in a computing system 102

454 removal of sensitivity label from data or document, as present or found or represented in a computing system 102

456 security gap or inconsistency, as present or found or represented in a computing system 102

458 alert, as present or found or represented in a computing system 102

460 email or message, as present or found or represented in a computing system 102

502 activity data, e.g., data representing computational activity; digital

504 policy data, e.g., data representing a policy 134; digital

506 classification data, e.g., data representing classification activity or results; digital

508 user profile data, e.g., data representing user profile(s); digital

510 tenant profile data, e.g., data representing cloud tenant profile(s); digital 512 identification of an operation in a computing system 514 volume of sensitive data; digital 516 app, a.k.a. application, user-facing program, user-facing software, as present or found or represented in a computing system 102

518 policy 134 presence status; digital 520 network share in a computing system 102

522 computational activity which is recognized in a computing system as posing a risk of inadvertent or unauthorized exfiltration 524 relative weight assigned to activity 522

526 copy data; computational activity 528 upload data; computational activity 530 transfer data; computational activity 532 access data; computational activity 534 print data; computational activity 536 personal area network, e.g., Universal Serial Bus, IEEE 1394, Bluetooth, or IEEE 802.15 compliant network; as opposed to LAN or WAN 538 unallowed app, as present or found or represented in a computing system 102

540 suspicious app, as present or found or represented in a computing system 102

602 computationally prioritize action or recommendation; priority assigned by such activity 604 computational prioritization mechanism 606 accuracy of classifier 442, as present or found or represented in a computing system 102

608 workload, as present or found or represented in a computing system 102

610 security vulnerability, as present or found or represented in a computing system 102

612 number of users; digital; especially number of implicated users, where user in this context means user account 614 implicated user, e.g., user whose data in a computing system is within scope of a risk or action, or who routinely processes or computationally accesses such data 616 behavior, e.g., computational activity 618 behavior frequency or total count, as present or found or represented in a computing system 102

702 list of risk contributions, as present or found or represented in a computing system 102

704 link to list of risk contributions, as present or found or represented in a computing system 102

706 risk contribution, as present or found or represented in a computing system 102, e.g., insight 820

708 link to list of mitigation actions, as present or found or represented in a computing system 102

710 list of mitigation actions, as present or found or represented in a computing system 102

712 user feedback regarding a recommendation 216, as present or found or represented in a computing system 102

800 example architecture suitable to provide or utilize functionality 204

802 user experience, as present or found or represented in a computing system 102

804 administrative portal, as present or found or represented in a computing system 102

806 cloud filtering service, as present or found or represented in a computing system 102

808 recommendation API, as present or found or represented in a computing system 102

810 data provider, as present or found or represented in a computing system 102

812 large dataset cluster, as present or found or represented in a computing system 102

814 input consolidator, as present or found or represented in a computing system 102

816 insight generator, as present or found or represented in a computing system 102

818 data store, as present or found or represented in a computing system 102

820 insight, as present or found or represented in a computing system 102

822 preference, as present or found or represented in a computing system 102

824 data lake storage, as present or found or represented in a computing system 102

826 log, as present or found or represented in a computing system 102

828 tenant label cache, as present or found or represented in a computing system 102

830 base stream consolidated log, as present or found or represented in a computing system 102

832 machine learning rule, as present or found or represented in a computing system 102

834 recommendation object event, as present or found or represented in a computing system 102

836 event grid configurator, as present or found or represented in a computing system 102

900 example architecture suitable to provide or utilize functionality 204

902 analytics API, as present or found or represented in a computing system 102

904 database, as present or found or represented in a computing system 102

906 objects, as present or found or represented in a computing system 102

908 job, e.g., periodic job, as present or found or represented in a computing system 102

910 exporter, as present or found or represented in a computing system 102

912 configuration or configurator, as present or found or represented in a computing system 102

914 event hub, as present or found or represented in a computing system 102

916 downloader, as present or found or represented in a computing system 102

918 analytics setting, as present or found or represented in a computing system 102

920 core library, as present or found or represented in a computing system 102

922 configuration reader, as present or found or represented in a computing system 102

924 big data pipeline, as present or found or represented in a computing system 102

1000 example architecture suitable to provide or utilize functionality 204

1002 fabric one, as present or found or represented in a computing system 102

1004 connector, as present or found or represented in a computing system 102

1006 dispatch, as present or found or represented in a computing system 102

1008 platform database storage, as present or found or represented in a computing system 102

1010 event hub storage, as present or found or represented in a computing system 102

1012 fabric two, as present or found or represented in a computing system 102

1014 objects, as present or found or represented in a computing system 102

1100 example architecture suitable to provide or utilize functionality 204

1102 database storage, as present or found or represented in a computing system 102

1200 example architecture suitable to provide or utilize functionality 204

1202 security web service, as present or found or represented in a computing system 102

1204 data explorer cluster, as present or found or represented in a computing system 102

1206 connection grid, as present or found or represented in a computing system 102

1208 insight storage, as present or found or represented in a computing system 102

1210 consolidate storage, as present or found or represented in a computing system 102

1212 enrichment storage, as present or found or represented in a computing system 102

1214 compliance boundary, as present or found or represented in a computing system 102

1300 flowchart; 1300 also refers to dynamic security policy generation methods that are illustrated by or consistent with the FIG. 13 flowchart or any variation of the FIG. 13 flowchart described herein

1302 computationally calculate a risk score or a constituent of a risk score, e.g., intermediate value, filter, transform

1304 computationally generate or update a security policy recommendation

1306 computationally generate or update a security policy

1308 computationally configure a machine per a security policy

1400 flowchart; 1400 also refers to dynamic security policy generation methods that are illustrated by or consistent with the FIG. 14 flowchart, which incorporates the FIG. 13 flowchart and other steps taught herein, or methods that are illustrated by or consistent with any variation of the FIG. 14 flowchart described herein

1402 computationally determine a document distribution, e.g., via scanning, sampling, statistical calculations

1404 computationally identify a sensitivity group

1406 computationally identify a classification group

1408 computationally determine an anomaly type

1410 computationally rank anomaly types

1412 computationally ascertain a security policy action

1414 computationally rank security policy actions

1416 computationally recommend a security policy action or security policy, e.g., by configuring a user interface 130

1418 computationally implement a security policy action or security policy, e.g., by performing the action or actions directed by the policy, in a computing system

1420 computationally detect an anomaly

1422 computationally group anomalies

1424 computationally present (a.k.a. surface) a security policy recommendation, e.g., by configuring a user interface 130 or sending a message or email to an admin

1426 computationally create (a.k.a. engineer) a machine learning feature

1428 computationally train a machine learning model

1430 computationally utilize a machine learning model, e.g., by communicating with the model or computationally utilizing an output of the model

1432 computationally utilize feedback regarding a recommendation, e.g., by modifying a model based at least partially on the feedback

1434 computationally identify a risk in a recommendation, e.g., in natural language

1436 computationally explain a risk in a recommendation, e.g., in natural language

1438 computationally obtain feedback regarding a recommendation, e.g., from a user interface or event tracking

1440 computationally tune a security policy

1442 computationally close a security gap

1444 computationally move a recommendation to a queue

1446 any step or item discussed in the present disclosure that has not been assigned some other reference numeral; 1446 may thus be shown expressly as a reference numeral for various steps or items or both, and may be added as a reference numeral (in the current disclosure or any subsequent patent application which claims priority to the current disclosure) for various steps or items or both without thereby adding new matter Conclusion Some embodiments address technical challenges arising from efforts to identify and mitigate security risks 402, in particular but not only, risks that sensitive data 210 will be exfiltrated 430. Some embodiments provide or utilize an anomaly detector 214 which is configured to detect 1420 a security anomaly 212 in data 118 based on at least a distribution 302 of sensitive information type 418 documents 124 in a collection 444 of documents and classifications 304 of documents 124 by trainable classifiers 442 based on machine learning 308. Some embodiments provide or utilize a security policy generator 218 which is configured to proactively and automatically generate 1304 security policy 134 recommendations 216, rank 306, 1414 at least two of the security policy recommendations, and present 1424 at least one top-ranked generated security policy recommendation in a user interface 130. Some embodiments generate 1304 a security policy 134 in a managed computing system 208 based on at least an anomaly score 416, and then configure 1308 the managed computing system according to the generated security policy.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method of securing data through dynamic policy generation, the method performed by a managing computing system, the method comprising proactively and automatically:

ingesting, by an anomaly detector of a managed computing system, base stream source data gathered by a data platform;

detecting, by the anomaly detector, exfiltration risk activities within the base stream source data;

calculating a ranked risk score based on at least a normalized sensitivity score and a dense ranked weight, wherein the dense ranked weight is derived from at least two differently weighted exfiltration risk activities detected by the anomaly detector, wherein the exfiltration risk activities comprise one or more of:
        a file uploaded from the managed computing system;
        a file transferred from the managed computing system; or
        a sensitivity label changed by the managed computing system;

calculating a combined anomaly score based on at least the ranked risk score;

calculating an anomaly score based on at least a transformation of the combined anomaly score;

automatically generating a security policy in the managed computing system based on at least the anomaly score; and automatically implementing the generated security policy in the managed computing system to prevent or mitigate data exfiltration operations within the computing system.

2. The method of claim 1, wherein the method comprises proactively and automatically:

determining a distribution of sensitive information type documents in a collection of documents; and calculating the normalized sensitivity score based on at least a result of the determining.

3. The method of claim 1, wherein automatically implementing the generated security policy in the managed computing system further comprises:

recommending the generated security policy via a user interface in the managed computing system, including presenting a mitigation action recommendation.

4. The method of claim 1, comprising at least two constituents, each constituent being one of:

determining a distribution of sensitive information type documents in a collection of documents;

identifying a high-level sensitivity group of sensitive information type documents which have sensitive information at or above a specified high sensitivity level;

determining a distribution of documents in the high-level sensitivity group over classifications of sensitivity;

identifying a high-level classification group of documents which are classified at or above a specified high classification level;

calculating a weighted sensitivity score based on at least the high-level sensitivity group and the high-level classification group;

determining and ranking anomaly types associated with one or more of the identified documents;

ascertaining a recommended data security policy action associated with one or more of the anomaly types; or ranking at least two recommended data security policy actions.

5. The method of claim 4, comprising at least four of the constituents.

6. A managed computing system which is configured to secure data through dynamic policy generation, the computing system comprising:

a digital memory;

a processor set comprising at least one processor, the processor set in operable communication with the digital memory;

a user interface;

an anomaly detector which is configured to, upon execution by the processor set:
        ingest base stream source data gathered by a data platform;
        detect a security anomaly in the base stream source data based on at least one of:
            a distribution of sensitive information type documents in a collection of documents; or
            classifications of documents by trainable classifiers based on machine learning; and a security policy generator which is configured to, upon execution by the processor set:
        automatically generate security policy recommendations based on the security anomaly;
        rank at least two of the security policy recommendations; and
        implement at least one top-ranked generated security policy recommendation in the managed computing system to prevent or mitigate the security anomaly.

7. The managed computing system of claim 6, wherein anomalies are grouped into categories which include at least three of: exfiltration through an anonymous link, exfiltration through a device, exfiltration through a file or folder operation, exfiltration through an email or message, or sensitivity label change or removal.

8. The managed computing system of claim 6, wherein the data platform comprises digital memory configured to gather the base stream source data which is utilized directly or indirectly by the anomaly detector, the base stream source data comprising at least three of: activity data, classification data, policy data, user profile data, or tenant profile data.

9. The managed computing system of claim 6, further comprising a machine learning feature engineer which upon execution creates at least one feature using the base stream source data, the feature representing at least one of: a volume of sensitive information for an identified operation, or a policy presence status indicating a presence or an absence of a security policy for sensitive information for an identified operation.

10. The managed computing system of claim 6, wherein the anomaly detector upon execution detects the security anomaly in data at least in part by utilizing a dense ranked weight which is based on at least weighted exfiltration risk activities which satisfy at least two of:

a file-copied-to-removable-media activity weight exceeds a file-uploaded-to-cloud activity weight;

a file-uploaded-to-cloud activity weight exceeds a file-transferred-by-personal-area-network activity weight;

a file-transferred-by-personal-area-network activity weight exceeds a sensitivity-label-changed activity weight;

a file-accessed-by-unallowed-app activity weight exceeds a file-uploaded-to-cloud activity weight;

a file-accessed-by-unallowed-app activity weight exceeds a file-accessed-by-suspicious-app activity weight;

a file-copied-to-removable-media activity weight exceeds a sensitivity-label-removed activity weight;

a file-copied-to-removable-media activity weight exceeds a file-printed activity weight;

a file-printed activity weight exceeds a file-copied-to-network-share activity weight; or a file-uploaded-to-suspicious-cloud activity weight exceeds a file-uploaded-to-cloud activity weight.

11. The managed computing system of claim 6, wherein the security policy generator upon execution ranks at least two of the security policy recommendations at least in part by prioritizing, and wherein prioritizing satisfies at least one of:

a higher data classifier accuracy contributes to a higher priority;

a greater workload vulnerability contributes to a higher priority;

a larger set of implicated users contributes to a higher priority; or a higher frequency of a behavior contributes to a higher priority.

12. The managed computing system of claim 6, wherein the anomaly detector upon execution detects the security anomaly in data based at least in part on at least one of: a per-user per-activity per-document risk score, or a per-user per-activity per-file risk score.

13. The managed computing system of claim 6, wherein the security policy generator upon execution generates a new security policy, and the security policy recommendation presented via the user interface corresponds to the new security policy.

14. The managed computing system of claim 6, wherein the security policy recommendations are presented via the user interface, and identify:

a security risk corresponding to the security anomaly;

a list of users, files, and actions which contribute to the security risk; and a mitigation action which upon performance mitigates the security risk.

15. A non-transitory computer-readable storage device configured with data and instructions which upon execution by a processor cause a computing system to perform a method of securing data, the method comprising proactively and automatically:

ingesting, by an anomaly detector of a managed computing system, base stream source data gathered by a data platform;

detecting, by the anomaly detector, exfiltration risk activities within the base stream source data;

calculating a ranked risk score based on at least a normalized sensitivity score and a dense ranked weight, wherein the dense ranked weight is derived from at least two differently weighted exfiltration risk activities detected by the anomaly detector, wherein the exfiltration risk activities comprise one or more of:

a file uploaded from the managed computing system;

a file transferred from the managed computing system; or a sensitivity label changed by the managed computing system;

calculating a combined anomaly score based on at least the ranked risk score;

calculating an anomaly score based on at least a box cox transformation of the combined anomaly score;

automatically generating a security policy in the managed computing system based on at least the anomaly score; and automatically implementing the generated security policy in the managed computing system to prevent or mitigate data exfiltration operations within the computing system.

16. The non-transitory computer-readable storage device of claim 15, wherein the method further comprises obtaining feedback on a presented security policy recommendation, and prioritizing another security policy recommendation based at least in part on the feedback.

17. The non-transitory computer-readable storage device of claim 15, wherein the method further comprises calculating the normalized sensitivity score based at least on classification data produced by machine learning classifiers which are trained to recognize sensitive documents.

18. The non-transitory computer-readable storage device of claim 15, wherein the method further comprises automatically and proactively tuning the security policy.

19. The non-transitory computer-readable storage device of claim 15, wherein the generated security policy closes a security gap which is not identified in any alert that is raised or pending resolution in the computing system during the generating or the implementing.

* * * * *